(12) United States Patent
Liu et al.

(10) Patent No.: US 12,200,743 B2
(45) Date of Patent: *Jan. 14, 2025

(54) RESOURCE CONFIGURATION METHOD AND APPARATUS

(71) Applicant: HUAWEI TECHNOLOGIES CO., LTD., Guangdong (CN)

(72) Inventors: Fengwei Liu, Chengdu (CN); Qiqi Mao, Shenzhen (CN); Shitong Yuan, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,719

(22) Filed: Sep. 7, 2023

(65) Prior Publication Data

US 2024/0073936 A1  Feb. 29, 2024

Related U.S. Application Data

(63) Continuation of application No. 17/371,965, filed on Jul. 9, 2021, now Pat. No. 11,785,626, which is a (Continued)

(30) Foreign Application Priority Data

Jan. 11, 2019 (CN) .......................... 201910028398.2
Aug. 23, 2019 (CN) .......................... 201910785412.3

(51) Int. Cl.
*H04W 72/53* (2023.01)

(52) U.S. Cl.
CPC .................................. *H04W 72/53* (2023.01)

(58) Field of Classification Search
CPC ..... H04W 72/04; H04W 72/53; H04W 72/20; H04W 84/047; H04W 72/0446; H04B 7/02; H04B 7/15542
See application file for complete search history.

(56) References Cited

U.S. PATENT DOCUMENTS 10,700,775 B2 * 6/2020 Novlan ............... H04B 7/15592
2018/0092139 A1 3/2018 Novlan et al.
(Continued)

FOREIGN PATENT DOCUMENTS

CN 110740503 1/2020
CN 110740503 A * 1/2020 ............ H04W 52/54
(Continued)

OTHER PUBLICATIONS

3GPP TSG RAN WG1 Meeting #95 Spokane, USA, Nov. 12-16, 2018, Agenda Item: 7.2.3.1; Source: Huawei, HiSilicon; Title: Physical layer design for N R IAB; Document for: Discussion and Decision (Year: 2018).
(Continued)

*Primary Examiner* — Mehmood B. Khan
(74) *Attorney, Agent, or Firm* — Fish & Richardson P.C.

(57) ABSTRACT

This application provides a resource configuration method and apparatus. A multiplexing type between a second functional unit and each of one or more antenna panels of a first functional unit is indicated to an IAB node, so that the IAB node obtains a resource configuration of an MT or a resource configuration of a DU based on the multiplexing type. This helps implement a resource configuration in the IAB node in a case of a plurality of antenna panels.

16 Claims, 9 Drawing Sheets

Related U.S. Application Data continuation of application No. PCT/CN2020/071735, filed on Jan. 13, 2020.

(56) References Cited

U.S. PATENT DOCUMENTS

| | | | | |
|---|---|---|---|---|
| 2019/0014533 | A1 | 1/2019 | Abedini et al. | |
| 2019/0021084 | A1* | 1/2019 | Stirling-Gallacher | H04W 72/51 |
| 2019/0349079 | A1* | 11/2019 | Novlan | H04B 7/15542 |
| 2020/0045563 | A1* | 2/2020 | Luo | H04W 40/12 |
| 2020/0059879 | A1* | 2/2020 | Nam | H04L 27/2666 |
| 2020/0107309 | A1* | 4/2020 | Akoum | H04W 72/046 |
| 2020/0107362 | A1* | 4/2020 | Qi | H04W 88/085 |
| 2020/0145952 | A1* | 5/2020 | Keskitalo | H04W 56/007 |
| 2020/0145965 | A1* | 5/2020 | Luo | H04B 7/15 |
| 2020/0145997 | A1* | 5/2020 | Luo | H04W 88/04 |
| 2020/0170010 | A1* | 5/2020 | Luo | H04L 5/26 |
| 2021/0250941 | A1* | 8/2021 | Tiirola | H04W 40/22 |
| 2021/0289495 | A1* | 9/2021 | Korhonen | H04W 72/0446 |
| 2021/0345303 | A1* | 11/2021 | Ying | H04W 72/04 |
| 2021/0368481 | A1* | 11/2021 | Jo | H04W 72/21 |
| 2021/0400661 | A1* | 12/2021 | Harada | H04W 72/23 |
| 2022/0006571 | A1* | 1/2022 | Basu Mallick | H04L 5/0055 |
| 2022/0015093 | A1* | 1/2022 | Ying | H04B 7/15542 |
| 2022/0086072 | A1* | 3/2022 | Chou | H04L 41/5051 |
| 2022/0095283 | A1* | 3/2022 | Wei | H04L 5/0032 |

FOREIGN PATENT DOCUMENTS

| | | | | |
|---|---|---|---|---|
| CN | 110896559 | | 3/2020 | |
| CN | 110896559 | A * | 3/2020 | H04W 24/10 |
| CN | 110972293 | A * | 4/2020 | H04L 5/0053 |
| CN | 108781438 | B | 11/2020 | |
| CN | 112352396 | | 2/2021 | |
| CN | 112352396 | A * | 2/2021 | H04B 7/024 |
| CN | 112889337 | | 6/2021 | |
| CN | 112889337 | A * | 6/2021 | H04W 28/0263 |
| CN | 112913179 | | 6/2021 | |
| CN | 112913179 | A * | 6/2021 | H04L 5/0033 |
| CN | 112913304 | | 6/2021 | |
| CN | 112913304 | A * | 6/2021 | H04L 1/0003 |
| GB | 2577529 | | 4/2020 | |
| GB | 2577529 | A * | 4/2020 | H04B 7/15542 |
| KR | 20200050280 | | 5/2020 | |
| WO | 2018026465 | | 2/2018 | |
| WO | 2018128504 | | 7/2018 | |
| WO | 2018143721 | | 8/2018 | |
| WO | 2020060232 | | 3/2020 | |
| WO | WO-2020060232 | A1 * | 3/2020 | H04W 72/20 |
| WO | 2020065590 | | 4/2020 | |
| WO | WO-2020065590 | A1 * | 4/2020 | H04W 56/0005 |
| WO | 2020205607 | | 10/2020 | |
| WO | WO-2020205607 | A1 * | 10/2020 | H04L 5/0053 |
| WO | 2020243312 | | 12/2020 | |
| WO | 2020243339 | | 12/2020 | |
| WO | WO-2020243312 | A1 * | 12/2020 | H04L 5/0053 |
| WO | WO-2020243339 | A1 * | 12/2020 | H04B 7/15542 |
| WO | 2021006636 | | 1/2021 | |
| WO | WO-2021006636 | A1 * | 1/2021 | H04L 27/2602 |

OTHER PUBLICATIONS

3GPP TS 38.473 V15.4.0 (Dec. 2018), "3rd Generation Partnership Project; Technical Specification Group Radio Access Network; NG-RAN; F1 application protocol (F1AP) (Release 15)," Dec. 2018, 192 pages.
3GPP TS 38.213 V15.3.0 (Sep. 2018), "3rd Generation Partnership Project; Technical Specification Group Radio Access Network; NR; Physical layer procedures for control (Release 15)," Sep. 2018, 101 pages.
Huawei, HiSilicon, "Physical layer design for NR IAB," 3GPP TSG RAN WG1 Meeting #94bis, R1-1810130, Chengdu, China, Oct. 8-12, 2018, 18 pages.
Huawei, HiSilicon, "Physical layer design for NR IAB," 3GPP TSG RAN WG1 Meeting #95, R1-1812198, Spokane, USA, Nov. 12-16, 2018, 15 pages.
PCT International Search Report and Written Opinion issued in International Application No. PCT/CN2020/071735 on Apr. 13, 2020, 18 pages (with English translation).
Office Action issued in Indian Application No. 202117035450 on Mar. 22, 2022, 8 pages.
3GPP TR 38.874 1.0.0 (Nov. 2018), "3rd Generation Partnership Project; Technical Specification Group Radio Access Network; Study on Integrated Access and Backhaul; (Release 15)," Nov. 2018, 110 pages.
Extended European Search Report issued in European Application No. 20738622.8 on Aug. 18, 2022, 6 pages.
Gu et al., "Millimeter Wave Multi-Hop Mobility and Trial Activities," 2018 Asia-Pacific Microwave Conference (APMC), Nov. 6, 2018, 3 pages.
LG Electronics, "Power Control in IAB Scenario," 3GPP TSG RAN WG1 Meeting #95, R1-1812568, Spokane, USA, Nov. 12-16, 2018, 4 pages.
Huawei, HiSilicon, "Resource Multiplexing between Backhaul and Access in IAB," 3GPP TSG RAN WG1 Meeting #98bis, R1-1910051, Chongqing, China, Oct. 14-20, 2019, 8 pages.
Nokia, Nokia Shanghai Bell, "Resource Allocation/Coordination between Parent BH and Child Links," 3GPP TSG RAN WG1 Meeting #95, R1-1812702, Spokane, USA, Nov. 12-16, 2018, 11 pages.
Office Action issued in Japanese Application No. 2021-540191 on Oct. 25, 2022, 13 pages (with English translation).
Qualcomm Incorporated, "Resource Management in IAB Network," 3GPP TSG RAN WG1 Meeting #95, R1-1813419, Spokane, USA, Nov. 12-16, 2018, 6 pages.
AT&T, "TP for 38.874 on PHY Enhancements for NR IAB," 3GPP TSG RAN WG1 Meeting #95, R1-1814190, Spokane, USA, Nov. 12-16, 2018, 22 pages.
Ericsson, "IAB resource allocation and multiplexing (revision of R1-1813566)," 3GPP TSG-RAN WG1 Meeting #95, R1-1814090, Spokane, U.S., Nov. 12-16, 2018, 6 pages.
Office Action in Korean Appln. No. 10-2021-7025219, mailed on Oct. 23, 2023, 14 pages (with English translation).

* cited by examiner

| | 0 | 1 | 2 | 3 | 4 | 5 | 6 | 7 | 8 | 9 | |
|---|---|---|---|---|---|---|---|---|---|---|---|
| MT resource | D | D | D | D | U | F | F | D | U | U | TDM |
| DU resource | Null | D-H | D-S | D-H | D-H | F-H | F-H | U-H | U-H | U-S | |
| MT resource | D | D | D | D | U | F | F | D | U | U | Static SDM |
| DU resource | Null | D-H | D-S | D-H | D-H | F-H | F-H | U-H | U-H | U-S | |
| MT resource | D | D | D | D | U | F | F | D | U | U | Full duplex |
| DU resource | D-H | D-H | D-H | D-H | D-S | F-H | F-H | U-H | U-H | U-S | |
| MT resource | D | D | D | D | U | F | F | D | U | U | Dynamic SDM |
| DU resource | Null | D-H | D-S | D-H | D-S | F-H | F-H | U-S | U-H | U-S | |

▨ Unavailable resource

FIG. 4

RESOURCE CONFIGURATION METHOD AND APPARATUS

CROSS-REFERENCE TO RELATED APPLICATIONS

This application is a continuation of U.S. patent application Ser. No. 17/371,965, filed on Jul. 9, 2021, which is a continuation of International Application No. PCT/CN2020/071735, filed on Jan. 13, 2020. The International Application claims priority to Chinese Patent Application No. 201910785412.3, filed on Aug. 23, 2019, Chinese Patent Application No. 201910028398.2, filed on Jan. 11, 2019. All of the afore-mentioned patent applications are hereby incorporated by reference in their entireties.

TECHNICAL FIELD

This application relates to the communications field, and more specifically, to a resource configuration method and apparatus.

BACKGROUND

As mobile communications technologies continuously develop, spectrum resources become increasingly insufficient. To improve spectrum utilization, base stations will be deployed more densely in the future. In addition, dense deployment can avoid coverage holes. In a conventional cellular network architecture, a base station is connected to a core network by using an optical fiber. However, fiber deployment is costly in many scenarios. A wireless relay node (relay node, RN) is connected to a core network by using a wireless backhaul link, so that optical fiber deployment costs can be partially reduced.

Usually, the relay node establishes a wireless backhaul link to one or more parent nodes, and accesses the core network through the parent node. The parent node may perform control (for example, data scheduling, timing modulation, and power control) on the relay node by using a plurality of types of signaling. In addition, the relay node may provide a service for a plurality of child nodes. The parent node of the relay node may be a base station or another relay node. The child node of the relay node may be a terminal or another relay node. In consideration of a high bandwidth of a future wireless network, an integrated access and backhaul (integrated access and backhaul, IAB) solution is considered to be introduced to 5G new radio (new radio, NR), to further reduce deployment costs and improve deployment flexibility. Therefore, an integrated access and backhaul relay, that is, an TAB node, is introduced.

The IAB node may include two parts of functional units: a mobile termination (mobile termination, MT) and a distributed unit (Distributed unit, DU). The MT is used by the IAB node to communicate with a parent node, and the DU is used by the IAB node to communicate with a child node. In a scenario with a plurality of antenna panels (panel) or cells, there is no solution for configuring MT resources and DU resources in an IAB node.

SUMMARY

In view of this, this application provides a resource configuration method and apparatus. A multiplexing type between a second functional unit and each of one or more antenna panels of a first functional unit is indicated to an TAB node, so that the TAB node obtains a resource configuration of an MT or a resource configuration of a DU based on the multiplexing type. This helps implement a resource configuration in the IAB node in a case of a plurality of antenna panels.

According to a first aspect, a resource configuration method is provided, including: A first node receives first indication information sent by a second node. The first indication information is used to indicate a resource multiplexing type between a second functional unit and each of one or more antenna panels of a first functional unit. The first node transmits data on resources of one or more antenna panels of the second functional unit. Resource types of the one or more antenna panels of the second functional unit are determined based on the resource multiplexing type. Therefore, after obtaining the resource multiplexing type, the first node can determine resources of the one or more antenna panels of the second functional unit with reference to a resource configuration of the first functional unit, thereby implementing a resource configuration in an TAB node in a case of a plurality of antenna panels.

In a possible implementation, the method further includes: The first node receives resource configuration information from the second node. The resource configuration information is used to indicate resources of the one or more antenna panels of the first functional unit in the first node. The resources of the one or more antenna panels of the second functional unit are determined based on the resource multiplexing type, the resources of the one or more antenna panels of the first functional unit, and a preset relationship. The preset relationship includes correspondences between resource configurations of the first functional unit and resource configurations of the second functional unit in the first node in cases of different resource multiplexing types. Therefore, the first node may further obtain the resource configuration of the first functional unit from the second node, and then search the preset relationship for the resource configuration of the second functional unit by using the resource configuration of the first functional unit.

In a possible implementation, the method further includes: The first node sends second indication information to the second node. The second indication information is used to indicate a resource multiplexing type supported between the second functional unit and each antenna panel of the first functional unit. Alternatively, the second indication information is used to indicate a resource multiplexing type supported between the second functional unit and a first antenna panel of the first functional unit, and the first antenna panel represents an antenna panel whose direction is the same as a direction of an antenna panel used by the second functional unit. Alternatively, the second indication information is used to indicate a resource multiplexing type supported between the second functional unit and a second antenna panel of the first functional unit, and the second antenna panel represents an antenna panel whose direction is different from a direction of an antenna panel used by the second functional unit. Therefore, the first node may report the supported resource multiplexing type to the second node, so that the second node can configure a resource multiplexing type for the first node with reference to the resource multiplexing type reported by the first node.

Optionally, the first functional unit is a mobile termination MT, and the second functional unit is a distributed unit DU. Alternatively, the first functional unit is a distributed unit DU, and the second functional unit is a mobile termination MT.

In a possible implementation, when a resource configuration of the DU is determined, the method further includes:

If there is a to-be-transmitted signal in the DU or the MT of the first node, the first node adjusts a resource in the resource configuration of the DU. A resource corresponding to the to-be-transmitted signal is a first-type resource. Therefore, for some special to-be-transmitted signals, to ensure successful transmission of these to-be-transmitted signals, the first node may adjust a resource in the resource configuration of the DU. "Adjustment" may be interpreted as adjusting a soft resource or an unavailable resource to a hard resource, or adjusting a hard resource to a soft resource or an unavailable resource.

Optionally, the to-be-transmitted signal includes one or more of the following signals: a synchronization signal block SSB and a random access channel RACH signal.

Optionally, if there is a to-be-transmitted signal in the DU of the first node, that the first node adjusts the resource configuration of the DU includes: If the first node determines that a first resource in the resource configuration of the DU is a second-type resource, the first node adjusts the first resource to a first-type resource. The first resource is a resource used by the DU of the first node to transmit the to-be-transmitted signal. To ensure successful transmission of the to-be-transmitted signal in the DU, it needs to be ensured that the resource that is used to transmit the to-be-transmitted signal and that is in the resource configuration of the DU is the hard resource. Therefore, if the first resource in the resource configuration of the DU is the soft resource or the unavailable resource, the first resource is converted into the hard resource.

Optionally, if there is a to-be-transmitted signal in the MT of the first node, that the first node adjusts the resource configuration of the DU includes: If the first node determines that a second resource in the resource configuration of the DU is a first-type resource, the first node adjusts the second resource to a second-type resource. The second resource is a resource that overlaps, in time domain, a resource used to transmit the to-be-transmitted signal in the MT of the first node. To ensure successful transmission of the to-be-transmitted signal in the MT, it needs to be ensured that the resource that is used to transmit the to-be-transmitted signal and that is in the resource configuration of the MT is the hard resource. Therefore, the second resource may be converted into the soft resource or the unavailable resource, to ensure successful transmission of the to-be-transmitted signal in the MT.

According to a second aspect, a resource configuration method is provided, including: A second node determines first indication information. The first indication information is used to indicate a resource multiplexing type between a second functional unit and each of one or more antenna panels of a first functional unit. The resource multiplexing type is used by a first node to determine resources of one or more antenna panels of the second functional unit. The second node sends the first indication information to the first node. Therefore, the second node sends the resource multiplexing type between the second functional unit and each of the one or more antenna panels of the first functional unit to the first node, so that the first node determines the resources of the one or more antenna panels of the second functional unit based on the resource multiplexing type and with reference to a resource configuration of the first functional unit, thereby implementing a resource configuration in an IAB node in a case of a plurality of antenna panels.

In a possible implementation, the method further includes: The second node sends resource configuration information to the first node. The resource configuration information is used to indicate resources of the one or more antenna panels of the first functional unit in the first node. Therefore, the second node sends the resource configuration of the first functional unit to the first node, so that the first node searches the preset relationship for the resource configuration of the second functional unit by using the resource configuration of the first functional unit.

In a possible implementation, the method further includes: The second node receives second indication information sent by the first node. The second indication information is used to indicate a resource multiplexing type supported between the second functional unit and each antenna panel of the first functional unit. Alternatively, the second indication information is used to indicate a resource multiplexing type supported between the second functional unit and a first antenna panel of the first functional unit, and the first antenna panel represents an antenna panel whose direction is the same as a direction of an antenna panel used by the second functional unit. Alternatively, the second indication information is used to indicate a resource multiplexing type supported between the second functional unit and a second antenna panel of the first functional unit, and the second antenna panel represents an antenna panel whose direction is different from a direction of an antenna panel used by the second functional unit. That a second node determines first indication information includes: The second node determines the first indication information based on the second indication information. Therefore, the second node receives the resource multiplexing type that is supported by the first node and that is reported by the first node, so that the second node can configure a resource multiplexing type for the first node with reference to the resource multiplexing type reported by the first node.

Optionally, the first functional unit is a mobile termination MT, and the second functional unit is a distributed unit DU. Alternatively, the first functional unit is a distributed unit DU, and the second functional unit is a mobile termination MT.

According to a third aspect, a communications apparatus is provided. The communications apparatus includes modules configured to perform the method according to any one of the first aspect or the possible implementations of the first aspect.

According to a fourth aspect, a communications apparatus is provided. The communications apparatus includes modules configured to perform the method in any one of the second aspect or the possible implementations of the second aspect.

According to a fifth aspect, a communications apparatus is provided. The communications apparatus may be the first node (for example, an IAB node or a terminal device) in the foregoing method designs, or may be a chip disposed in the first node. The communications apparatus includes a processor. The processor is coupled to a memory, and may be configured to execute an instruction in the memory, to implement the method performed by the first node in any one of the first aspect or the possible implementations of the first aspect. Optionally, the communications apparatus further includes the memory. Optionally, the communications apparatus further includes a communications interface. The processor is coupled to the communications interface.

When the communications apparatus is the first node, the communications interface may be a transceiver or an input/output interface.

When the communications apparatus is the chip disposed in the first node, the communications interface may be an input/output interface.

Optionally, the transceiver may be a transceiver circuit. Optionally, the input/output interface may be an input/output circuit.

According to a sixth aspect, a communications apparatus is provided. The communications apparatus may be the second node (for example, a donor base station) in the foregoing method designs, or may be a chip disposed in the second node. The communications apparatus includes a processor. The processor is coupled to a memory, and may be configured to execute an instruction in the memory, to implement the method performed by the second node in any one of the second aspect or the possible implementations of the second aspect. Optionally, the communications apparatus further includes the memory. Optionally, the communications apparatus further includes a communications interface. The processor is coupled to the communications interface.

When the communications apparatus is the second node, the communications interface may be a transceiver or an input/output interface.

When the communications apparatus is the chip disposed in the second node, the communications interface may be an input/output interface.

Optionally, the transceiver may be a transceiver circuit. Optionally, the input/output interface may be an input/output circuit.

According to a seventh aspect, a program is provided. When being executed by a processor, the program is configured to perform any method in the first aspect or the second aspect or the possible implementations of the first aspect or the second aspect.

According to an eighth aspect, a program product is provided. The program product includes program code. When the program code is run by a communications unit, a processing unit, a transceiver, or a processor of a communications apparatus (for example, a first node), the communications device is enabled to perform any method in the first aspect or the possible implementations of the first aspect.

According to a ninth aspect, a program product is provided. The program product includes program code. When the program code is run by a communications unit, a processing unit, a transceiver, or a processor of a communications apparatus (for example, a second node), the communications device is enabled to perform the method in any one of the second aspect or the possible implementations of the second aspect.

According to a tenth aspect, a computer-readable storage medium is provided. The computer-readable storage medium stores a program. The program enables a communications apparatus (for example, a first node) to perform the method in any one of the first aspect or the possible implementations of the first aspect.

According to an eleventh aspect, a computer-readable storage medium is provided. The computer-readable storage medium stores a program. The program enables a communications apparatus (for example, a second node) to perform any method in the second aspect or the possible implementations of the second aspect.

BRIEF DESCRIPTION OF DRAWINGS

FIG. 4 is a schematic diagram of correspondences between resource configurations of one antenna panel of a DU and resource configurations of an MT in cases of different resource multiplexing types;

DESCRIPTION OF EMBODIMENTS

The following describes technical solutions of this application with reference to the accompanying drawings.

In the descriptions of the embodiments of this application, unless otherwise stated, "a plurality" or "a plurality of" means two or more than two. In addition, "at least one" may be replaced with "one or more".

It should be understood that names of all nodes and messages in this application are merely names set for ease of description in this application, and may be different names in an actual network. It should not be understood that names of various nodes and messages are limited in this application. On the contrary, any name that has a same or similar function as that of a node or a message used in this application is considered as a method or an equivalent replacement in this application, and is within the protection scope of this application. Details are not described below.

In consideration of a high bandwidth of a future wireless network, an integrated access and backhaul (integrated access and backhaul, IAB) solution is considered to be introduced into 5th generation (5th generation, 5G) new radio (new radio, NR) to further reduce deployment costs and improve deployment flexibility, and an integrated access and backhaul relay is introduced accordingly. In this application, a relay node that supports integrated access and backhaul is referred to as an IAB node (IAB node), so that the relay node is distinguished from a long term evolution (long term evolution, LTE) relay. A system including the IAB node is also referred to as a relay system.

Figure 1:
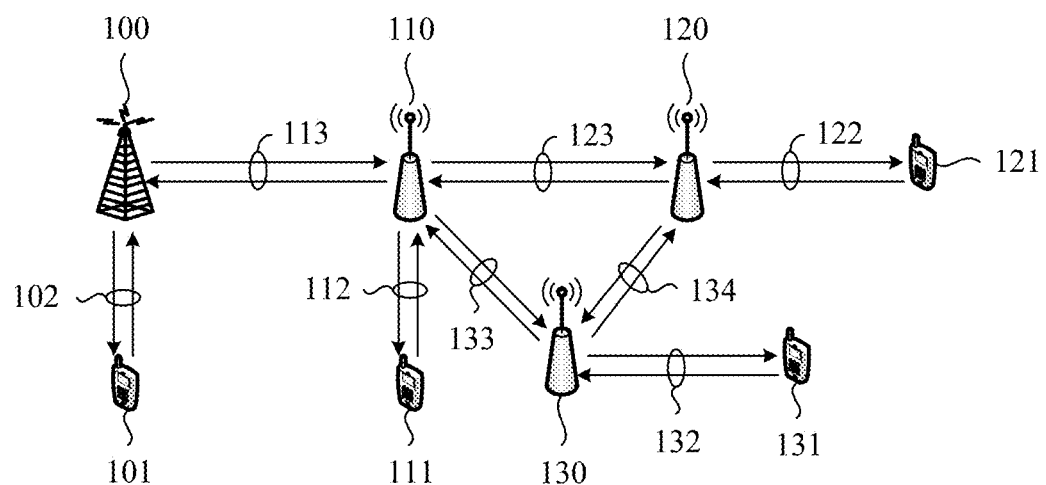
FIG. 1 is a schematic structural diagram of a communications system to which the embodiments of this application are applicable.

To better understand a resource configuration method and apparatus disclosed in the embodiments of this application, the following first describes a network architecture used in the embodiments of the present invention. FIG. 1 is a schematic structural diagram of a communications system to which the embodiments of this application are applicable.

It should be noted that the communications system mentioned in the embodiments of this application includes but is not limited to a narrowband internet of things (narrowband internet of things, NB-IoT) system, a wireless local area network (wireless local area network, WLAN) system, an LTE system, a next-generation 5G mobile communications system such as NR or a communications system after 5G, and a device to device (device to device, D2D) communications system.

In the communications system shown in FIG. 1, an integrated access and backhaul IAB system is provided. One IAB system includes at least one base station 100, one or more terminal devices (terminal) 101 served by the base station 100, one or more relay node IAB nodes, and one or more terminal devices 111 served by the IAB node 110. Usually, the base station 100 is referred to as a donor base station (donor next generation node B, DgNB), and the IAB node 110 is connected to the base station 100 by using a wireless backhaul link 113. In this application, the donor base station is also referred to as a donor node, namely, a donor node. The base station includes but is not limited to: an evolved NodeB (evolved NodeB, eNB), a radio network controller (radio network controller, RNC), a node B (node B, NB), a base station controller (base station controller, BSC), a base transceiver station (base transceiver station, BTS), a home base station (for example, a home evolved NodeB, or a home node B, HNB), a baseband unit (baseband Unit, BBU), an eLTE (evolved LTE, eLTE) base station, an NR base station (next generation node B, gNB), and the like. The terminal device includes but is not limited to: any one of user equipment (user equipment, UE), a mobile station, an access terminal, a user unit, a user station, a mobile station, a remote station, a remote terminal, a mobile device, a terminal, a wireless communications device, a user agent, and a station (station, ST) that is in a wireless local area network (wireless local access network, WLAN), a cellular telephone, a cordless telephone, a session initiation protocol (SIP) telephone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a mobile station in a future 5G network, a terminal device in a future evolved public land mobile network (public land mobile network, PLMN), or the like. The IAB node is a specific name of the relay node, and does not constitute a limitation on solutions in the embodiments of this application. The IAB node may be one of the foregoing base stations or terminal devices that have a forwarding function, or may be in an independent device form.

The integrated access and backhaul system may further include a plurality of other IAB nodes, for example, an IAB node 120 and an IAB node 130. The IAB node 120 is connected to the IAB node 110 by using a wireless backhaul link 123, to access a network. The IAB node 130 is connected to the IAB node 110 by using a wireless backhaul link 133, to access the network. The IAB node 120 serves one or more terminal devices 121. The IAB node 130 serves one or more terminal devices 131. In FIG. 1, both the IAB node 110 and the IAB node 120 are connected to the network by using a wireless backhaul link. In this application, the wireless backhaul link is viewed from a perspective of a relay node. For example, the wireless backhaul link 113 is a backhaul link of the IAB node 110, and the wireless backhaul link 123 is a backhaul link of the IAB node 120. As shown in FIG. 1, one IAB node such as the IAB node 120 may be connected to another IAB node 110 by using a wireless backhaul link such as the wireless backhaul link 123, to access the network. In addition, the relay node may be connected to the network by using a plurality of levels of wireless relay nodes. It should be understood that, in this application, the IAB node is used only for a purpose of description, and does not indicate that the solutions of this application are used only in an NR scenario. In this application, the IAB node may be any node or device that has a relay function. It should be understood that use of the IAB node and use of the relay node in this application have a same meaning.

For ease of description, the following defines basic terms or concepts used in the embodiments of this application.

Parent node: A node that provides a wireless backhaul link resource, such as the IAB node 110, is referred to as a parent node of the IAB node 120. It should be understood that the parent node may be an IAB node, a donor base station (for example, a donor node), a network device, or the like. This is not limited.

Child node: A node that transmits data to a network or receives data from a network on a backhaul link resource is referred to as a child node, where for example, the IAB node 120 is referred to as a child node of the relay node 110, and the terminal device 131 may be referred to as a child node of the relay node 130; and the network is a network on a core network or another access network such as the Internet or a dedicated network.

Access link: An access link is a wireless link used by a node to communicate with a child node of the node, and includes an uplink transmission link and a downlink transmission link. On the access link, uplink transmission is also referred to as uplink transmission on the access link, and downlink transmission is also referred to as downlink transmission on the access link. The node includes but is not limited to the foregoing IAB node.

Backhaul link: A backhaul link is a wireless link used by a node to communicate with a parent node of the node, and includes an uplink transmission link and a downlink transmission link. On the backhaul link, uplink transmission is also referred to as uplink transmission on the backhaul link, and downlink transmission is also referred to as downlink transmission on the backhaul link. The node includes but is not limited to the foregoing IAB node.

In another description, an IAB node may be divided into two parts, that is, a mobile termination (mobile termination, MT) and a distributed unit (distributed unit, DU). The MT is used by the IAB node to communicate with a parent node, and the DU is used by the IAB node to communicate with a child node. A link between the MT in the IAB node and a parent node is referred to as a parent BH link (parent BH link), and a link between the DU in the IAB node and a child IAB node is referred to as a child BH link (child BH link). However, a link between the DU in the IAB node and subordinate UE is referred to as an access link (access link). However, in this application, for ease of description, a link between the IAB node and a parent node is referred to as a backhaul link, and a link between the IAB node and a child IAB node and/or UE are collectively referred to as an access link.

Usually, a child node may be considered as a terminal device of a parent node. It should be understood that, in the integrated access and backhaul system shown in FIG. 1, one IAB node is connected to one parent node. However, in a future relay system, to improve reliability of a wireless backhaul link, one IAB node such as the IAB node 120 may have a plurality of parent nodes that simultaneously serve the IAB node. For example, the IAB node 130 in the figure may further be connected to the IAB node 120 by using a backhaul link 134. In other words, both the IAB node 110 and the IAB node 120 are parent nodes of the IAB node 130. Names of the IAB nodes 110, 120, and 130 do not limit a scenario or a network in which the IAB nodes 110, 120, and 130 are deployed, and may be any other names such as relay and RN. In this application, the IAB node is used only for ease of description.

In FIG. 1, the wireless links 102, 112, 122, 132, 113, 123, 133, and 134 may be bidirectional links, including uplink and downlink transmission links. Particularly, the wireless backhaul links 113, 123, 133, and 134 may be used by a parent node to provide a service for a child node. For example, the parent node 100 provides a wireless backhaul service for the child node 110. It should be understood that an uplink and a downlink of the backhaul link may be separated, that is, transmission is not performed on the uplink and the downlink by using a same node. The downlink transmission refers to transmitting information or data by a parent node such as the node 100 to a child node such as the node 110. The uplink transmission refers to transmitting information or data by a child node such as the node 110 to a parent node such as the node 100. The node is not limited to a network node or a terminal device. For example, in a D2D scenario, a terminal device may serve as a relay node to provide a service for another terminal device. In some scenarios, the wireless backhaul link may alternatively be an access link. For example, the backhaul link 123 may alternatively be considered as an access link for the node 110, and the backhaul link 113 is alternatively an access link for the node 100. It should be understood that the parent node may be a base station, or may be a relay node, and the child node may be a relay node, or may be a terminal device having a relay function. For example, in a D2D scenario, the child node may alternatively be a terminal device.

The relay node shown in FIG. 1, such as the relay node 110, 120, or 130, may exist in two forms. One form is that the relay node exists as an independent access node, and may independently manage a terminal device that accesses the relay node. In this case, the relay node usually has an independent physical cell identifier (physical cell identifier, PCI). A relay in this form usually needs to have a complete protocol stack function, for example, a radio resource control (radio resource control, RRC) function. This type of relay is usually referred to as a layer 3 relay. However, a relay node in another form and a donor node such as a donor eNB or a donor gNB, belong to a same cell, and a user is managed by a donor base station such as the donor node. This type of relay is usually referred to as a layer 2 relay. A layer 2 relay usually exists as a DU of a base station DgNB in a centralized unit and distributed unit (central unit and Distributed unit, CU-DU) architecture of NR, and communicates with a CU through an F1 application protocol (F1 application protocol, F1-AP) interface or by using a tunneling protocol. The tunneling protocol may be, for example, the general packet radio service tunneling protocol (general packet radio service tunneling protocol, GTP). Details are not described again. The donor node is a node that may be used to access a core network, or is an anchor base station in a radio access network, and the anchor base station may be used to access the network. The anchor base station is responsible for receiving data from the core network and forwarding the data to the relay node, or receiving data from the relay node and forwarding the data to the core network.

Usually, a donor node in a relay system is referred to as an IAB donor, namely, a donor node. In this application, the two nouns may be used alternately. It should be understood that the IAB donor and the donor node should not be understood as entities or network elements that have different functions.

In the embodiments of this application, the relay node (for example, the IAB node), the terminal device, or the network device includes a hardware layer, an operating system layer running on the hardware layer, and an application layer running on an operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer readable component, carrier, or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), and a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

For ease of understanding, some terms or concepts in the embodiments of this application are explained herein.

MT resource: The MT resource is a resource used by an MT function of the IAB node. The MT resource may be configured as an uplink (uplink, U) resource, a downlink (downlink, D) resource, or a flexible (flexible, F) resource.

In addition, MT resources may further be classified into the following two types of resources:

An available resource is a resource that may be scheduled by a parent node.

An unavailable (null, N) resource is a resource that is not scheduled by a parent node. A person skilled in the art should understand that in actual use, the unavailable resource may also be denoted as "NULL". This imposes no limitation on the embodiments of this application.

In the embodiments of this application, the available resource and the unavailable resource of the MT may be explicitly configured by the parent node by using higher layer signaling (for example, RRC signaling), or may be implicitly derived by the IAB node by using a DU resource type. A manner in which the available resource and the unavailable resource of the MT are obtained is not limited in the embodiments of this application.

DU resource: The DU resource is a resource used by a DU function of the IAB node. The DU resource may be configured as an uplink (uplink, U) resource, a downlink (downlink, D) resource, a flexible (flexible, F) resource, or an unavailable (null, N) resource. Further, uplink resources of a DU may be classified into a soft (soft, S) resource and a hard (hard, H) resource. Downlink resources of the DU may be classified into a soft resource and a hard resource. Flexible resources of the DU may be classified into a soft resource and a hard resource.

Soft resource: Whether a resource can be used by the DU depends on an indication of a parent node.

Hard resource: The hard resource is a resource that can always be used by the DU.

In this application, the soft resource and the hard resource of the DU may be explicitly configured by the parent node by using higher layer signaling (for example, RRC signaling) or an interface message (for example, an F1-AP interface message or an enhanced F1-AP interface message), or may be implicitly derived by the IAB node by using a resource configuration of an MT. A manner in which the soft resource and the hard resource of the DU are obtained is not limited in this application.

There may be different resource multiplexing types between MT resources and DU resources in an IAB node, for example, time division multiplexing (time division multiplexing, TDM), static space division multiplexing (space division multiplexing, SDM), dynamic SDM, or full-duplex multiplexing. In cases of different resource multiplexing types, there may be different correspondences between a resource configuration of an MT resource and a resource configuration of a DU resource. For example, if a resource multiplexing type is TDM, the MT and the DU of the IAB node cannot simultaneously perform transmission. If a resource multiplexing type is SDM, the MT and the DU can simultaneously perform receiving or sending. If a resource multiplexing type is full duplex, the MT and the DU can simultaneously perform transmission, where the simultaneous transmission is not limited to simultaneous receiving or simultaneous sending.

Figure 2:
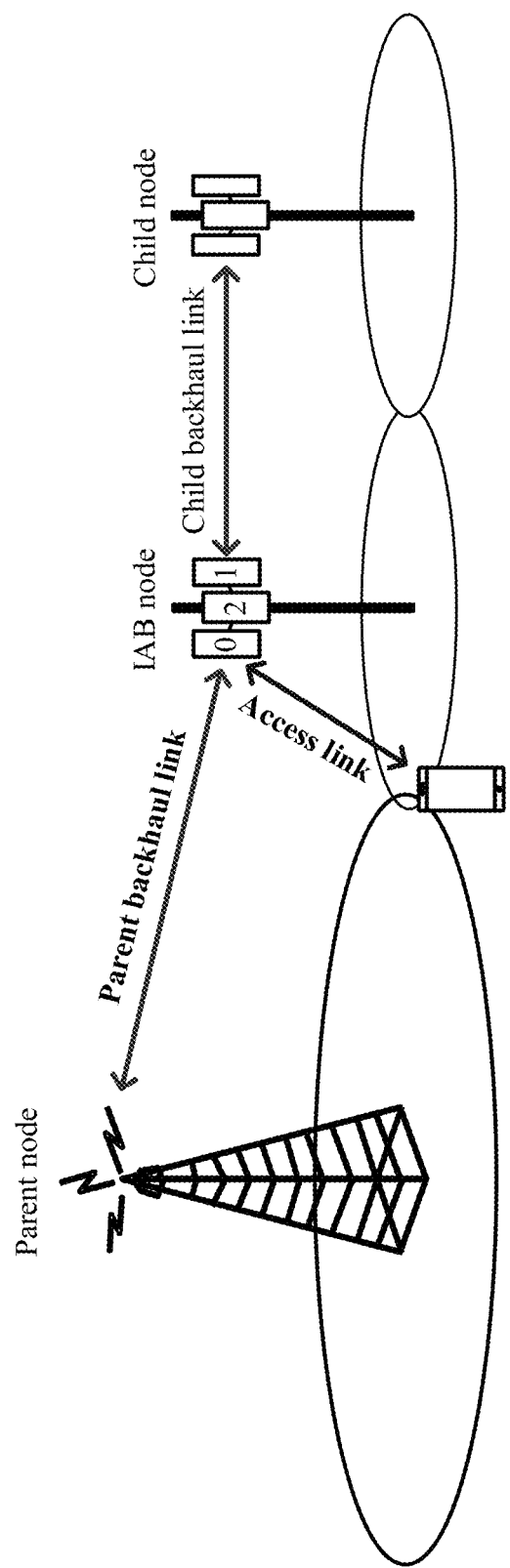
FIG. 2 is a schematic diagram of an example of a scenario with a plurality of antenna panels.

FIG. 2 is a schematic diagram of an example of a scenario with a plurality of antenna panels. As shown in FIG. 2, an TAB node has a plurality of antenna panels (for example, three antenna panels: an antenna panel 0, an antenna panel 1, and an antenna panel 2). The TAB node may communicate with a parent node, a child node, or access UE by using the plurality of antenna panels. It should be understood that a quantity of the antenna panels of the TAB node is not limited in this embodiment of this application. In FIG. 2, the three antenna panels are used only as an example for description.

Figure 3:
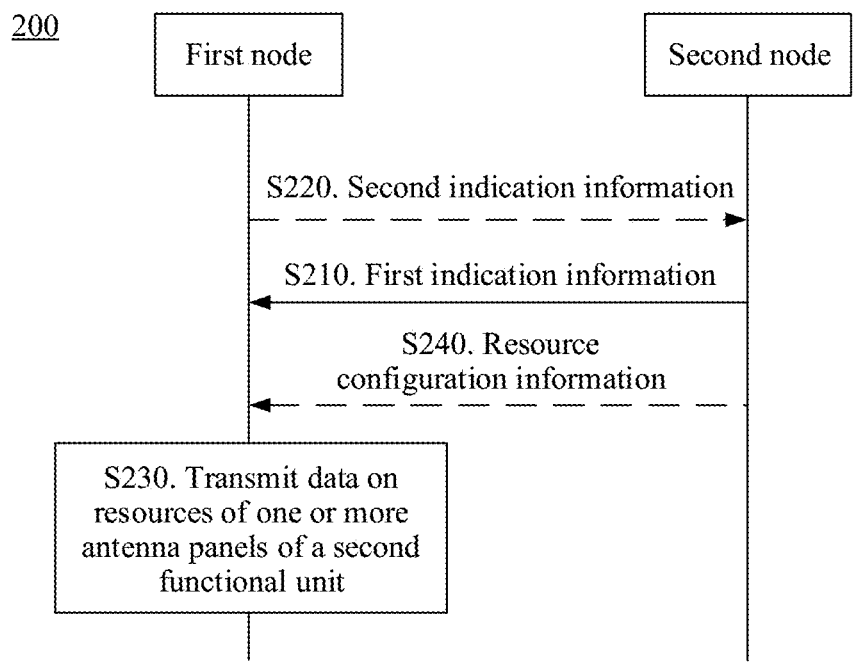
FIG. 3 is a schematic interaction diagram of a resource configuration method according to an embodiment of this application.

FIG. 3 is a schematic interaction diagram of a resource configuration method 200 according to an embodiment of this application. As shown in FIG. 3, the method 200 includes the following step.

S210. A second node sends first indication information to a first node, where the first indication information is used to indicate a resource multiplexing type between a second functional unit and each of one or more antenna panels of a first functional unit. Correspondingly, the first node receives the first indication information.

The first node may be a relay node, for example, an TAB node.

The second node may be a parent node of the first node. For description of the parent node, refer to the foregoing description, and details are not described herein again. Herein, when the second node is an TAB node, signaling sent by the TAB node to the first node may be generated and sent to the second node by a parent node (for example, a donor node) of the second node. Signaling sent by the first node to the second node may also be sent by the second node to the parent node of the second node.

The resource multiplexing type between the second functional unit and each of the one or more antenna panels of the first functional unit is configured by the second node for the first node. The resource multiplexing type may be time division multiplexing TDM, static space division multiplexing SDM, dynamic SDM, or full-duplex multiplexing.

Herein, the first functional unit may be a mobile termination MT. Correspondingly, the second functional unit is a distributed unit DU. Alternatively, the first functional unit may be a distributed unit DU, and the second functional unit is a mobile termination MT.

It should be understood that, for ease of description, the antenna panel is used as an example for description in this embodiment of this application. However, this constitutes no limitation on the protection scope of this embodiment of this application. The technical solution in this embodiment of this application is not only applicable to different antenna panels, but also applicable to different cells, and may also be applicable to different subunits. That is, different antenna panels may be replaced with different cells. Alternatively, different antenna panels are replaced with different subunits. For example, a DU of the IAB node has a plurality of subunits, or an MT of the IAB node has a plurality of subunits. For the MT, the subunit may be represented by a cell, a cell group, a carrier, a carrier group, or a bandwidth part (Bandwidth part, BWP). For example, when the MT uses carrier aggregation transmission, the MT has a plurality of cells or a plurality of carriers, and the plurality of cells or plurality of carriers are subunits of the MT. When the MT uses multi-connection transmission, the MT has a plurality of cell groups or carrier groups, and the plurality of cell groups or carrier groups are subunits of the MT. For the DU, the subunit may be represented by a cell, a cell group, a carrier, a carrier group, or an antenna panel. For example, the DU may have a plurality of panels facing different directions, and each antenna panel corresponds to one cell. Therefore, the subunit may be represented by an antenna panel or a cell. For another example, the DU may have a plurality of carriers, and each carrier corresponds to one cell. Therefore, the subunit may be represented by a carrier or a cell.

That the first functional unit is the DU and the second functional unit is the MT is used as an example. The second node may indicate that antenna panels of the DU have different resource configurations, and resource multiplexing types between the resource configurations corresponding to the antenna panels and an MT resource are different. Alternatively, the second node may indicate that resources of cells of the DU have different resource configurations, and resource multiplexing types between the resource configurations corresponding to the cells and an MT resource are different. Alternatively, the second node may indicate that resources of subunits of the DU have different resource configurations, and resource multiplexing types between the subunits and an MT resource are different. Herein, a person skilled in the art should understand that resource multiplexing of a DU resource and the MT resource may be understood as resource multiplexing performed when a signal is transmitted on a resource corresponding to each antenna panel/each cell/each subunit.

Optionally, different antenna panels may correspond to different cell identifiers (identifier, ID), or may correspond to a same cell ID. This is not limited.

For example, in a possible implementation, when the IAB node provides a service for a child node or UE, the DU may support running of a plurality of cells, and the plurality of cells have different cell IDs. Optionally, different cells use different antenna panels, and the second node may configure resource multiplexing types between the different cells of the DU and the MT in the first node. In another possible implementation, an MT of the IAB node establishes connections to a plurality of parent nodes, that is, the MT may communicate with different cells.

It should be understood that, for configuring the resource multiplexing type by the second node for the first node, refer to a resource multiplexing type that is supported by the first node and that is reported by the first node. Alternatively, the second node may configure the resource multiplexing type by itself. This is not limited.

If the first node does not report the resource multiplexing type supported by the first node, or even if the first node reports the resource multiplexing type supported by the first node, the second node may configure resource multiplexing types between the MT and all antenna panels of the DU to be TDM; or the second node may configure, when the MT and the DU use a same antenna panel, a resource multiplexing type between the MT and the DU to be TDM, and may configure, when the MT and the DU use different antenna panels, a resource multiplexing type between the MT and the DU to be semi-static SDM or dynamic SDM.

"Same antenna panel" means that the MT and the DU use a same antenna panel, or an antenna panel used by the MT and an antenna panel used by the DU face a same transmission direction. "Different antenna panels" means that the MT and the DU use different antenna panels, or an antenna panel used by the MT and an antenna panel used by the DU face different directions.

In this embodiment of this application, the "same antenna panel" may be represented by using another concept or term, for example, co-location, quasi-co-location, co-direction, strong correlation, or mutual impact. This is centrally described herein, and details are not described below. In another possible implementation, before the second node explicitly configures a resource multiplexing type for the first node, a default resource multiplexing type is used between the MT and the DU in the first node. The default resource multiplexing type includes the following cases: Resource multiplexing types between the MT and all antenna panels of the DU are TDM, or a resource multiplexing type between the MT and the DU is TDM when the MT and the DU use a same antenna panel, and a resource multiplexing type between the MT and the DU is semi-static SDM or dynamic SDM when the MT and the DU use different antenna panels.

For a case in which the first node reports the resource multiplexing type supported by the first node to the second node, optionally, the method 200 further includes the following steps.

S220. The first node sends second indication information to the second node, where the second indication information is used to indicate a resource multiplexing type supported between the second functional unit and each antenna panel of the first functional unit; or the second indication information is used to indicate a resource multiplexing type supported between the second functional unit and a first antenna panel of the first functional unit, and the first antenna panel represents an antenna panel whose direction is the same as a direction of an antenna panel used by the second functional unit, or the first antenna panel is a same antenna panel used by the first functional unit and the second functional unit; or the second indication information is used to indicate a resource multiplexing type supported between the second functional unit and a second antenna panel of the first functional unit, and the second antenna panel represents an antenna panel whose direction is different from a direction of an antenna panel used by the second functional unit. In other words, the first node may report a co-location relationship between an antenna panel used by the MT and an antenna panel of the DU (where the co-location relationship is used to indicate whether the antenna panel used by the MT is the same as the antenna panel of the DU) to the second node.

That the first functional unit is the DU and the second functional unit is the MT is used as an example. The first node may report resource multiplexing types supported between antenna panels of the DU and the MT in the first node to the second node by using the second indication information, where the resource multiplexing types are specifically resource multiplexing types that are between the MT and different antenna panels of the DU and that are used when the MT performs transmission by using one or more antenna panels. Correspondingly, the second node may determine, based on the resource multiplexing types that are supported between the antenna panels of the DU and the MT and that are reported by the first node, whether the MT and the DU use a same antenna panel.

Alternatively, for example, the first node may report a resource multiplexing type supported between the first antenna panel of the DU and the MT, or a resource multiplexing type supported between the second antenna panel of the DU and the MT to the second node by using the second indication information. Further, the second indication information may further include an identifier of the first antenna panel.

Optionally, the second indication information may further indicate the identifier of the first antenna panel or an identifier of the second antenna panel. It should be understood that an identifier of an antenna panel may be a panel ID or a cell ID. Alternatively, an antenna panel may be identified by using an identifier of a reference signal or a reference signal resource identifier, for example, an identifier of a synchronization signal block (synchronization signal block, SSB), an identifier of a channel state information-reference signal (channel state information-reference signal, CSI-RS), an identifier of a CSI-RS resource, an identifier of a sounding reference signal (sounding reference signal, SRS) resource, or the like. This is not limited herein.

Specifically, the first node and/or the second node may distinguish between different antenna panels by using reference signal identifiers. For example, for a downlink reference signal set 0 and a downlink reference signal set 1, each downlink reference signal set includes at least one downlink reference signal. The MT uses an antenna panel 0 to receive or send the downlink reference signal set 0, and uses an antenna panel 1 to receive or send the downlink reference signal set 1. Therefore, the first node should report a resource multiplexing type between the MT and the DU or a co-location relationship between the MT and an antenna panel of the DU, where the resource multiplexing type or the co-location relationship is used when the MT receives or sends the downlink reference signal set 0 and the downlink reference signal set 1. For example, the IAB node may report that an antenna panel used by an MT of the IAB node when the MT receives a downlink reference signal set is co-located with an antenna panel of the DU. It should be noted that, it is assumed herein that remaining signals (for example, a physical uplink shared channel (physical uplink shared channel, PUSCH) and a physical downlink shared channel (physical downlink shared channel, PDSCH)) that are received and sent by the MT and at least one downlink reference signal set have a spatial quasi co-located (quasi co-located, QCL) relationship, or use a same antenna panel.

For example, the second node may configure a resource multiplexing type for the first node with reference to a resource multiplexing type reported by the first node. For example:

When the resource multiplexing type reported by the first node is full-duplex multiplexing (herein, if the first node supports full-duplex multiplexing, the first node may be considered by default as also supporting all remaining resource multiplexing types), the second node may configure TDM, dynamic SDM, semi-static SDM, or full duplex.

When the resource multiplexing type reported by the first node is semi-static SDM, the second node may configure TDM, dynamic SDM, or semi-static SDM.

When the resource multiplexing type reported by the first node is dynamic SDM, the second node may configure TDM or dynamic SDM.

When the resource multiplexing type reported by the first node is TDM, the second node may configure TDM. In a possible implementation, after receiving the resource multiplexing type reported by the first node, the second node may configure a resource multiplexing type for the first node in another manner without referring to content reported by the first node. This is not limited.

Optionally, the foregoing resource multiplexing types have different capability requirements. "Capability" includes one or more of the following content: receiving/sending isolation, antenna isolation, an interference suppression capability, and the like. Usually, the IAB node has the following capability requirements in cases of different resource multiplexing types in the following sequence: TDM<dynamic SDM<static SDM<full duplex. To be specific, full duplex requires high receiving/sending isolation (or relatively high antenna isolation, or a relatively high interference suppression capability), and TDM requires relatively low receiving/sending isolation (or relatively low antenna isolation, or a relatively low interference suppression capability). After the first node reports a supportable resource multiplexing type to the second node, a resource multiplexing type configured by the second node for the first node should have a same or lower capability requirement. For example, after the first node reports that a resource multiplexing type that can be supported between the MT and one or more antenna panels of the DU in the first node is static SDM, the resource multiplexing type configured by the second node for the first node may be static SDM, dynamic SDM, or TDM, but cannot be full duplex.

Optionally, the second node may configure a type of special soft resource for the first node. When the first node performs switching or re-accessing, the first node may use the special soft resource to communicate with a parent node on a corresponding MT resource, for example, to receive a PDSCH or a physical downlink control channel (physical downlink control channel, PDCCH) used to carry a random access response message (random access response, RAR).

S230. The first node transmits data on resources of one or more antenna panels of the second functional unit, where resource types of the one or more antenna panels of the second functional unit are determined based on the resource multiplexing type.

In this embodiment of this application, the second node sends the resource multiplexing type to the first node by using the first indication information. The resource multiplexing type refers to a different resource multiplexing type between each of the multiple antenna panels of the first functional unit and the second functional unit. After obtaining the resource multiplexing type, the first node may determine the resources of the one or more antenna panels of the second functional unit with reference to a resource configuration of the first functional unit, and finally transmit data on the resources of the one or more antenna panels of the second functional unit, thereby implementing a resource configuration in an IAB node in a case of a plurality of antenna panels or cells.

In an implementation, the DU of the first node may use all antenna panels, and the MT may use one antenna panel. There may be different resource multiplexing types between the MT and different antenna panels of the DU. For example, when the antenna panel of the MT is the same as an antenna panel of the DU, a resource multiplexing type between the MT and the antenna panel of the DU may be TDM or dynamic SDM. For another example, when an antenna panel of the MT is different from an antenna panel of the DU, a resource multiplexing type between the MT and the antenna panel of the DU may be semi-static SDM or full duplex. The scenario described in FIG. 3 is used as an example. For the antenna panel 0 and the antenna panel 1, the antenna panel 0 is shared by the MT and the DU, and a resource multiplexing type between the MT and the antenna panel 0 of the DU is time division multiplexing TDM. However, the antenna panel 1 is used only by the DU. Therefore, a resource multiplexing type between the MT and the antenna panel 1 of the DU may be TDM, or may be semi-static SDM.

It should be understood that the foregoing is merely described by using an example in which the MT uses one antenna panel, but constitutes no limitation on this embodiment of this application. In other words, the MT may alternatively perform receiving or sending by using different antenna panels. For example, the MT supports receiving of data by using a plurality of antenna panels, or the MT uses a plurality of antenna panels to perform mobility measurement, beam training, or the like.

Optionally, the second node may further send resource configuration information of the first functional unit to the first node, so that the first node may determine a resource configuration of the one or more antenna panels of the second functional unit based on the resource configuration information of the first functional unit. Before the first node determines the resource configuration of the one or more antenna panels of the second functional unit, the method 200 further includes the following step.

S240. The second node sends the resource configuration information to the first node, where the resource configuration information is used to indicate resources of the one or more antenna panels of the first functional unit in the first node. Correspondingly, the first node receives the resource configuration information.

The first node determines the resources of the one or more antenna panels of the second functional unit based on the resource multiplexing type indicated in the first indication information, the resources of the one or more antenna panels of the first functional unit, and a preset relationship.

Specifically, the second node may send the resource configuration information to the first node by using semi-static signaling (for example, RRC signaling) or an interface message (for example, an F1-AP interface message or an enhanced F1-AP interface message). The first node may learn, by using the resource configuration information, of the resources of the one or more antenna panels of the first functional unit in the first node. Then, the first node determines the resources of the one or more antenna panels of the second functional unit based on the resource multiplexing type indicated in the first indication information, the resources of the one or more antenna panels of the first functional unit, and the preset relationship.

The preset relationship includes correspondences between resource configurations of the first functional unit and resource configurations of the second functional unit in the first node in cases of different resource multiplexing types. Herein, in different resource multiplexing types, there are different correspondences between resource configurations of the DU and resource configurations of the MT.

The embodiments described in this application may also be applied to a case in which both the MT and the DU have a plurality of subunits.

The plurality of subunits of the MT and the plurality of subunits of the DU may have different multiplexing types, and the multiplexing types are described in the foregoing embodiment. The multiplexing type may be reported by the first node to the second node, or may be configured by the second node for the first node.

For example, in a possible implementation, the second node configures a resource type for each subunit of the MT of the first node. The MT resource type includes at least one of available and unavailable. The first node and/or a parent node of the first node derive/derives a resource type of each subunit of the DU based on a multiplexing relationship between the MT subunit and the DU subunit, where resource types of the DU include at least one of a hard resource, a soft resource, and an unavailable resource.

In another possible implementation, the second node configures a resource type as a hard resource or a soft resource for each subunit of the DU of the first node, and the first node and/or the parent node of the first node derive/derives availability of each resource of each subunit of the MT based on the multiplexing relationship between the MT subunit and the DU subunit.

It should be understood that resource types configured by the second node for the MT and DU subunits of the first node may further include a transmission direction, where the transmission direction includes downlink (downlink, represented by D), uplink (uplink, represented by U), and flexible (flexible, represented by F).

FIG. 4 is a schematic diagram of correspondences between resource configurations of one antenna panel of a DU and resource configurations of an MT in cases of different resource multiplexing types. The following describes the preset relationship with reference to a specific example in FIG. 4.

Case 1: A resource multiplexing type is TDM.

In this case, a correspondence between a resource configuration of one antenna panel of the DU and a resource configuration of the MT is reflected as follows: For a hard resource of the DU, a corresponding resource of the MT is an unavailable resource, to be specific, the MT does not communicate with a parent node on the resource. Alternatively, for an unavailable resource of the MT, a corresponding resource of the DU is a hard resource. For 10 slots shown in FIG. 4, in TDM, resources corresponding to the DU in a slot 1 (D-H), a slot 3 (D-H), a slot 4 (D-H), a slot 5 (F-H), a slot 6 (F-H), a slot 7 (U-H), and a slot 8 (U-H) are hard resources, and MT resources corresponding to the MT in these slots are unavailable resources. For a slot 0 (where a resource in the DU is an unavailable (NULL) resource), a slot 2 (where a resource in the DU is a downlink soft resource D-S), and a slot 9 (where a resource in the DU is an uplink soft resource U-S), MT resources corresponding to the MT in these slots are available resources.

It should be understood that resource configurations of one antenna panel of the DU and resource configurations of the MT in TDM in FIG. 4 are merely some examples. The following provides all possible combination manners of resource configurations of one antenna panel of the DU and resource configurations of the MT in the first node in the TDM scenario. For details, refer to Table 1.

TABLE 1

| Resource configuration of the DU | Resource configuration of the MT | | |
|---|---|---|---|
| | DL | UL | F |
| Downlink hard resource (DL-H) | DU: Tx<br>MT: NULL | DU: Tx<br>MT: NULL | DU: Tx<br>MT: NULL |
| Downlink soft resource (DL-S) | When a DU resource is IA, DU: Tx MT: NULL<br>When a DU resource is INA, DU: NULL MT: Rx | When a DU resource is IA, DU: Tx MT: NULL<br>When a DU resource is INA, DU: NULL MT: Tx | When a DU resource is IA, DU: Tx MT: NULL<br>When a DU resource is INA, DU: NULL MT: Tx/Rx |
| Uplink hard resource (UL-H) | DU: Rx<br>MT: NULL | DU: Rx<br>MT: NULL | DU: Rx<br>MT: NULL |
| Uplink soft resource (UL-S) | When a DU resource is IA, DU: Rx MT: NULL<br>When a DU resource is INA, DU: NULL MT: Rx | When a DU resource is IA, DU: Rx MT: NULL<br>When a DU resource is INA, DU: NULL MT: Tx | When a DU resource is IA, DU: Rx MT: NULL<br>When a DU resource is INA, DU: NULL MT: Tx/Rx |
| Flexible hardware resource (F-H) | DU: Tx/Rx<br>MT: NULL | DU: Tx/Rx<br>MT: NULL | DU: Tx/Rx<br>MT: NULL |
| Flexible soft resource (F-S) | When a DU resource is IA, DU: Tx/Rx MT: NULL<br>When a DU resource is INA, DU: NULL MT: Rx | When a DU resource is IA, DU: Tx/Rx MT: NULL<br>When a DU resource is INA, DU: NULL MT: Tx | When a DU resource is IA, DU: Tx/Rx MT: NULL<br>When a DU resource is INA, DU: NULL MT: Tx/Rx |
| Unavailable resource (NA) | DU: NULL<br>MT: Rx | DU: NULL<br>MT: Tx | DU: NULL<br>MT: Tx/Rx |

In Table 1, "MT: Tx" indicates that the MT should perform transmission after being scheduled. "DU: Tx" indicates that the DU may perform transmission. "MT: Rx" indicates that the MT has a capability of receiving a signal (if there is any signal to be received). "DU: Rx" indicates that the DU may schedule a child node to perform uplink transmission. "MT: Tx/Rx" indicates that the MT should perform transmission or reception after being scheduled, but the transmission and reception do not simultaneously occur. "DU: Tx/Rx" indicates that the DU may perform transmission or receive transmission from a child node, but the transmission and reception do not simultaneously occur.

"IA" indicates that the DU resource is explicitly or implicitly indicated as available. "INA" indicates that the DU resource is explicitly or implicitly indicated as unavailable. "MT: NULL" indicates that the MT does not perform sending and it is not necessary for the MT to have a receiving capability. "DU: NULL" indicates that the DU does not perform sending and does not receive transmission from a child node.

Case 2: A resource multiplexing type is static SDM.

In this case, a correspondence between a resource configuration of one antenna panel of the DU and a resource configuration of the MT is reflected as follows: When the DU and the MT have a same transmission direction, for a hard resource of the DU, a corresponding resource of the MT is an unavailable resource, in other words, the MT does not communicate with a parent node on the resource. When the DU and the MT have opposite transmission directions, for a hard resource of the DU, a corresponding resource of the MT is an available resource. Alternatively, when the DU and the MT have a same transmission direction, for an unavailable resource of the MT, a corresponding resource of the DU is a hard resource. When the DU and the MT have opposite transmission directions, for an available resource of the MT, a corresponding resource of the DU may be a hard resource. As shown in FIG. 4, in static SDM, resources corresponding to the DU in a slot 1 (D-H), a slot 3 (D-H), a slot 4 (D-H), a slot 5 (F-H), a slot 6 (F-H), a slot 7 (U-H), and a slot 8 (U-H) are hard resources, and MT resources corresponding to the MT in slots in a transmission direction the same as that of the DU or in slots corresponding to flexible resources (including the slot 1, the slot 3, the slot 5, the slot 6, and the slot 8, where in these slots, resources corresponding to the DU are also flexible resources) are unavailable resources. However, for a slot 0 (in which a resource in the DU is an unavailable (NULL) resource), a slot 2 (in which a resource in the DU is a downlink soft resource D-S), a slot 4 (in which a resource in the DU is a downlink hard resource D-H), a slot 7 (in which a resource in the DU is an uplink soft resource U-S), and a slot 9 (in which a resource in the DU is an uplink soft resource U-S), MT resources corresponding to the MT in these slots are available resources. MT resources corresponding to the MT in slots (including the slot 4) having a transmission direction opposite to that of the DU are available resources. It can be learned that for the slot 4, resource configurations of the DU are different and resource configurations of the MT are different in cases of different resource multiplexing types.

It should be understood that the resource configurations of one antenna panel of the DU and the resource configurations of the MT in an SDM scenario in FIG. 4 are merely some examples. The following provides all possible combination manners of resource configurations of one antenna panel of a DU and resource configurations of an MT in a first node in the SDM scenario, as shown in Table 2.

TABLE 2

| Resource configuration of the DU | Resource configuration of the MT | | |
|---|---|---|---|
| | DL | UL | F |
| DL-H | DU: Tx<br>MT: NULL | DU: Tx<br>MT: Tx | DU: Tx<br>MT: Tx |
| DL-S | When a DU resource is IA, DU: Tx MT: NULL | When a DU resource is IA, DU: Tx MT: Tx | When a DU resource is IA, DU: Tx MT: Tx |

TABLE 2-continued

| Resource configuration of the DU | Resource configuration of the MT | | |
|---|---|---|---|
| | DL | UL | F |
| | When a DU resource is INA, DU: NULL MT: Rx | When a DU resource is INA, DU: NULL MT: Tx | When a DU resource is INA, DU: NULL MT: Tx/Rx |
| UL-H | DU: Rx<br>MT: Rx | DU: Rx<br>MT: NULL | DU: Rx<br>MT: Rx |
| UL-S | When a DU resource is IA, DU: Rx MT: Rx | When a DU resource is IA, DU: Rx MT: NULL | When a DU resource is IA, DU: Rx (only when the MT is Rx and the DU knows that the MT is Rx in advance) MT: Rx |
| | When a DU resource is INA, DU: NULL MT: Rx | When a DU resource is INA, DU: NULL MT: Tx | When a DU resource is INA, DU: NULL MT: Tx/Rx |
| F-H | DU: Tx/Rx MT: Rx (only when the DU is Rx and a DU in parent node knows that the DU is Rx in advance) | DU: Tx/Rx MT: Tx (only when the DU is Tx and a parent node knows that the DU is Tx in advance) | DU: Tx/Rx MT: Tx (only when the DU is Tx and the parent DU knows that the DU is Tx in advance), Rx (only when the DU is Rx and the parent DU knows that the DU is Rx in advance) |
| F-S | When a DU resource is IA, DU: Tx/Rx MT: Rx (only when the DU is Rx and the parent DU knows that the DU is Rx in advance) When a DU resource is INA, DU: NULL MT: Rx | When a DU resource is IA, DU: Tx/Rx MT: Tx (only when the DU is Tx and the parent DU knows that the DU is Tx in advance) When a DU resource is INA, DU: NULL MT: Tx | When a DU resource is IA, DU: Tx/Rx MT: Tx (only when the DU is Tx and the parent DU knows that the DU is Tx in advance), Rx (only when the DU is Rx and the parent DU knows that the DU is Rx in advance) When a DU resource is INA, DU: NULL MT: Tx/Rx |
| NA | DU: NULL MT: Rx | DU: NULL MT: Tx | DU: NULL MT: Tx/Rx |

For explanations or concepts of terms in Table 2, refer to the descriptions in Table 1. For brevity, details are not described herein again.

For example, when a resource type of the DU is F, according to Table 2, the parent node needs to know a specific transmission direction of the DU in advance, to determine whether to perform spatial multiplexing transmission. To achieve this objective, an IAB node may report a transmission direction of the F resource in the DU in advance, so that a DU of the parent node performs scheduling.

Alternatively, in another possible implementation, when the IAB node is not configured to report an actual direction of the F resource of the DU, if the F resource of the DU is (explicitly or implicitly) configured as a hard resource, spatial multiplexing transmission is not performed, and if the F resource is a soft resource, dynamic SDM is performed, that is, only dynamic SDM is allowed for the F resource of the DU.

Case 3: A resource multiplexing type is full duplex.

In this case, receiving and sending of the MT and the DU may not affect each other, that is, a resource configuration of the MT and a resource configuration of the DU do not affect each other. As shown in FIG. 4, in a full-duplex case, a resource of the DU in each slot may be a hard resource, and a resource of the MT in each slot may be an available resource.

Case 4: A resource multiplexing type is dynamic SDM.

A difference between the dynamic SDM and static SDM lies in that whether the DU and the MT perform SDM depends on scheduling or an indication of a second node, that is, spatial multiplexing is performed only between an available resource of the MT and a soft resource of the DU. As shown in FIG. 4, in dynamic SDM, resources corresponding to the DU in a slot 1 (D-H), a slot 3 (D-H), a slot 5 (F-H), a slot 6 (F-H), a slot 7 (U-H), and a slot 8 (U-H) are hard resources, and MT resources corresponding to the MT in slots in a transmission direction the same as that of the DU or in slots corresponding to flexible resources (including the slot 1, the slot 3, the slot 5, the slot 6, and the slot 8, where in these slots, resources corresponding to the DU are also flexible resources) are unavailable resources. However, for a slot 0 (in which a resource in the DU is an unavailable (NULL) resource), a slot 2 (in which a resource in the DU is a downlink soft resource D-S), a slot 4 (in which a resource in the DU is a downlink soft resource D-S), a slot 7 (in which a resource in the DU is an uplink soft resource U-S), and a slot 9 (in which a resource in the DU is an uplink soft resource U-S), MT resources corresponding to the MT in these slots are available resources. A difference between a resource configuration of the DU in dynamic SDM and a resource configuration of the DU in static SDM lies in that, in dynamic SDM, a resource of the DU in the slot 4 is a soft resource.

In a possible implementation, when the DU resource is F, only dynamic SDM may be performed. To be specific, the IAB node first determines a transmission direction of a corresponding MT resource, and then schedules the DU resource. Transmission on the DU resource determined by the IAB node may enable the DU and the MT to simultaneously perform sending, or the DU and the MT to simultaneously perform receiving. It should be understood that the slots in FIG. 4 are merely used as an example for description herein, but do not constitute a limitation on the embodiments of this application. Actually, the slot may be replaced with another time domain resource, for example, a frame, a subframe, a mini-slot, or a symbol.

It should be further understood that the technical solutions in the embodiments of this application may be not limited to the foregoing four cases, and may also be applicable to another resource multiplexing type, for example, FDM (including static FDM and dynamic FDM, where a resource configuration in static FDM is the same as that in static SDM, and a resource configuration in dynamic FDM is the same as that in dynamic SDM). This is not limited.

In the scenario with a plurality of antenna panels, there is the foregoing preset relationship. After the first node receives the resources of the one or more antenna panels of the first functional unit, the resources of one or more antenna panels of the second functional unit may be determined by using the preset relationship corresponding to the resource multiplexing type (for example, if the resource multiplexing type is TDM, Table 1 is searched; or if the resource multiplexing type is SDM, Table 2 is searched). Specifically, if the first functional unit is a DU, the second functional unit is an MT, and the second node sends resource configurations of some or all antenna panels of the DU to the first node, the first node obtains a resource multiplexing type between the MT and the antenna panel of the DU, and then performs searching by using a preset relationship corresponding to the resource multiplexing type, to determine a resource configuration of the MT. Alternatively, if the first functional unit is an MT, the second functional unit is a DU, and the second node sends resource configurations of some or all antenna panels of the MT to the first node, the first node obtains a resource multiplexing type between the DU and the antenna panel of the MT, and then performs searching by using a preset relationship corresponding to the resource multiplexing type, to determine a resource configuration of the DU.

For example, the first functional unit is a DU, and the second functional unit is an MT. It is assumed that the DU can use all antenna panels, and the MT can use only one of a plurality of antenna panels. In this case, the first indication information can be used to indicate a resource multiplexing type between the MT and each of the plurality of antenna panels of the DU. There may be different resource multiplexing types between the MT and different antenna panels of the DU. The first node may determine a resource configuration of the MT based on a resource multiplexing type indicated in the first indication information and a resource configuration of the DU. For example, the first indication information indicates that a resource multiplexing type between the MT and an antenna panel 0 of the DU is TDM, and the first node may obtain a resource configuration of the MT by searching Table 1. Alternatively, the first indication information indicates that a resource multiplexing type between the MT and an antenna panel 1 of the DU is SDM, and the first node may obtain a resource configuration of the MT by searching Table 2. For example, when the resource multiplexing type between the MT and the antenna panel 0 of the DU is TDM, if a slot in resources of the antenna panel 0 of the DU is DL-H, it can be learned from Table 1 that an MT resource is NULL.

Figure 5:
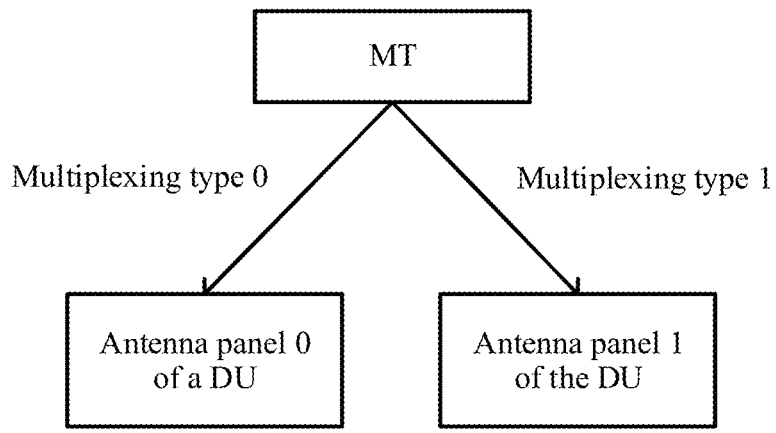
FIG. 5 is a schematic diagram of multiplexing types between one antenna panel of an MT and two antenna panels of a DU.

For example, the first functional unit is an MT, and the second functional unit is a DU. It is assumed that the DU may use all antenna panels, and the MT may use only one of a plurality of antenna panels. In this case, the first indication information may be used to indicate a corresponding resource multiplexing type between an antenna panel of the MT and each antenna panel of the DU. The first node may determine a resource configuration of the DU based on a resource multiplexing type indicated in the first indication information and a resource configuration of the MT. For example, the first indication information indicates that a resource multiplexing type between the MT and an antenna panel 0 of the DU is TDM, and the first node may obtain a resource configuration of the DU by searching Table 1. Alternatively, the first indication information indicates that a resource multiplexing type between the MT and an antenna panel 1 of the DU is SDM, and the first node may obtain a resource configuration of the DU by searching Table 2. FIG. 5 is a schematic diagram of multiplexing types between one antenna panel of an MT and two antenna panels of a DU. As shown in FIG. 5, a resource multiplexing type between an antenna panel of the MT and an antenna panel 0 of the DU is a multiplexing type 0, and a resource multiplexing type between the antenna panel of the MT and an antenna panel 1 of the DU is a multiplexing type 1. In FIG. 5, a resource of the MT needs to be jointly determined based on a result derived based on the resource multiplexing type 0 and a result derived based on the resource multiplexing type 1. For example, if the first node determines, based on the resource multiplexing type 0 and a resource of the antenna panel 0 of the DU, that a resource of the MT is an available resource, and determines, based on the resource multiplexing type 1 and a resource of the antenna panel 1 of the DU, that the resource of the MT is an unavailable resource, the resource should finally be determined as an available resource. If the first node determines, based on the resource of the antenna panel 0 of the DU and the resource multiplexing type 0, that a result is an unavailable resource, and determines, based on the resource of the antenna panel 1 of the DU and the resource multiplexing type 1, that a result is an unavailable resource, the resource of the MT is an unavailable resource.

Figure 6:
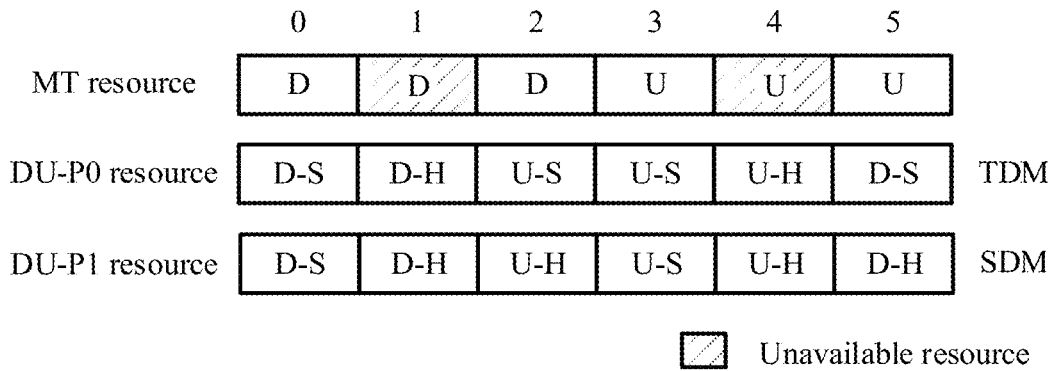
FIG. 6 is a schematic diagram of resource configurations of one antenna panel of an MT and two antenna panels of a DU.

FIG. 6 shows an example in the scenario in FIG. 5. As shown in FIG. 6, a resource multiplexing type 0 between resources of an MT and an antenna panel 0 of a DU is TDM. A resource multiplexing type 1 between the resources of the MT and an antenna panel 1 of the DU is SDM. In a slot 0, a slot 1, a slot 2, a slot 3, a slot 4, and a slot 5, resources of the MT are respectively: D, D, D, U, U, and U; resources of the antenna panel 0 of the DU are respectively: D-S, D-H, U-S, U-S, U-H, and D-S; and resources of the antenna panel 1 of the DU are respectively D-S, D-H, U-H, U-S, U-H, and D-H.

The second node may configure resources for all different antenna panels of the DU of the first node. For example, resource types may include D-S, D-H, U-S, U-H, F-H, F-S, and NA. In addition, the resources of the MT may be jointly derived by the first node based on resource configurations of a plurality of antenna panels of the DU. For a same resource, different antenna panels of the DU may have different resource configurations. In FIG. 6, for a same uplink resource (corresponding to the slot 2) of the DU, the uplink resource is a soft resource on the antenna panel 0 and is a hard resource on the antenna panel 1; and a corresponding resource of the MT is a downlink resource (where a status is an available resource). An available resource of the MT is jointly derived based on resource configurations of the antenna panel 0 and the antenna panel 1 of the DU. In other words, an available resource corresponding to the MT in the slot 2 is obtained based on an intersection of an available resource of the MT that is derived based on the antenna panel 0 of the DU and an available resource of the MT that is derived based on the antenna panel 1 of the DU.

Alternatively, the second node may configure resources for some antenna panels of the DU of the first node. For example, resource types may include D-S, D-H, U-S, U-H, F-H, F-S, and NA. For example, the second node may configure, for the DU of the first node, resources of an antenna panel the same as an antenna panel of the MT, so that the first node can derive resources of the MT based on a preset relationship and a resource multiplexing type. For resources of another antenna panel, the first node may derive the resources based on a resource multiplexing type and the resources of the MT. Herein, a derivation manner of the first node may not be limited, provided that derivation results meet preset relationships in cases of different resource multiplexing types. In FIG. 6, if the second node configures resources of the antenna panel 0 of the DU, the first node may derive the resource configuration of the MT based on a resource multiplexing type (TDM) and a preset relationship. Further, resources of the antenna panel 1 of the DU may be derived based on a resource (whether the resource is available) of the MT, a resource multiplexing type (SDM), and a preset relationship.

Alternatively, the second node may configure resources of the MT for the first node. The first node may obtain, based on a resource configuration of the MT and with reference to a resource multiplexing type between the MT and a DU that uses an antenna panel the same as an antenna panel of the MT, a resource configuration of the DU of which the antenna panel is the same as the antenna panel of the MT; or may obtain, based on a resource configuration of the MT and with reference to a resource multiplexing type between the MT and a DU that uses a different antenna panel from an antenna panel of the MT, a resource configuration of the DU that uses the different antenna panel from the antenna panel of the MT.

Therefore, regardless of whether resources first configured by the second node for the first node are MT resources or DU resources, the first node may derive a corresponding resource configuration based on a preset relationship and a resource multiplexing type.

The foregoing describes an example in which the MT resources are derived when the second node configures the DU resources for the first node, or the DU resources are derived when the MT resources are configured for the first node. In practice, the second node may further configure resources for the first node in a full configuration manner. To be specific, the second node simultaneously configures MT resources (including an available resource and an unavailable resource) and DU resources (including a soft resource and a hard resource) for the first node. Herein, the first node does not need to derive resources based on the foregoing preset relationship. However, a resource configuration of any antenna panel of the MT, and a resource configuration of any antenna panel of the DU that are configured by the second node should meet a resource configuration constraint (that is, the foregoing preset relationship) in a case of a corresponding resource multiplexing type.

The foregoing example (for example, FIG. 5 or FIG. 6) describes an embodiment of a plurality of antenna panels of the DU and one antenna panel of the MT in the first node. Optionally, the MT may alternatively use a plurality of antenna panels. The following describes an embodiment of a plurality of antenna panels of a DU and a plurality of antenna panels of an MT. It should be understood that for terms or concepts such as a resource multiplexing type and a preset relationship in the following embodiment, refer to the foregoing descriptions. Details are not described below again.

If the second node first configures resources of each antenna panel of the MT for the first node, the first node may determine resources of each antenna panel of the DU based on the resources of each antenna panel of the MT and a preset relationship. An available resource set may be independently configured for each antenna panel of the MT. Available resources of different antenna panels of the MT may be orthogonal in time domain or spatial domain, or may overlap in time domain or spatial domain. This is not limited. Correspondingly, the first node may determine, based on resource configurations of the different antenna panels of the MT, that resource configuration results of a resource configuration of one antenna panel of the DU may be different. Optionally, the first node may determine a DU resource according to the following principle: For one DU resource (for example, one slot or one symbol), if results determined by the first node based on resources of different antenna panels of the MT and resource multiplexing types are each a hard resource, the DU resource is a hard resource. If a result determined by the first node based on a resource of one antenna panel of the MT and a resource multiplexing type is a soft resource, that is, if a result of the DU resource is derived as a soft resource for even only one of a plurality of antenna panels of the MT, the DU resource is a soft resource. In other words, the soft resource of the DU is a union set of soft resources determined based on different antenna panels of the MT.

Similarly, if the second node first configures resources of each antenna panel of the DU for the first node, the first node may determine resources of each antenna panel of the MT based on the resources of each antenna panel of the DU and a preset relationship. Certainly, whether a resource of each antenna panel of the MT is an available resource may be determined based on derivation results of a plurality of antenna panels of the DU.

Optionally, the first node may determine an MT resource according to the following principle: For one MT resource, if results determined by the first node based on resources of different antenna panels of the DU and resource multiplexing types are each an unavailable resource, the MT resource is an unavailable resource. If a result determined by the first node based on a resource of one antenna panel of the DU and a resource multiplexing type is an available resource, that is, if a result of the MT resource is derived as an available resource for even only one of a plurality of antenna panels of the DU, the MT resource is an available resource. In other words, the available resource of the MT is a union set of available resources determined based on different antenna panels of the DU.

Optionally, the first node may alternatively determine an MT resource according to the following principle: For one MT resource, if results determined by the first node based on resources of different antenna panels of the DU and resource multiplexing types are each an available resource, the MT resource is an available resource. If a result determined by the first node based on a resource of one antenna panel of the DU and a resource multiplexing type is an unavailable resource, that is, if a result of the MT resource is derived as an unavailable resource for even only one of a plurality of antenna panels or cells of the DU, the MT resource is an unavailable resource. In other words, an unavailable resource of the MT is a union set of unavailable resources determined based on different antenna panels of the DU.

Figure 7:
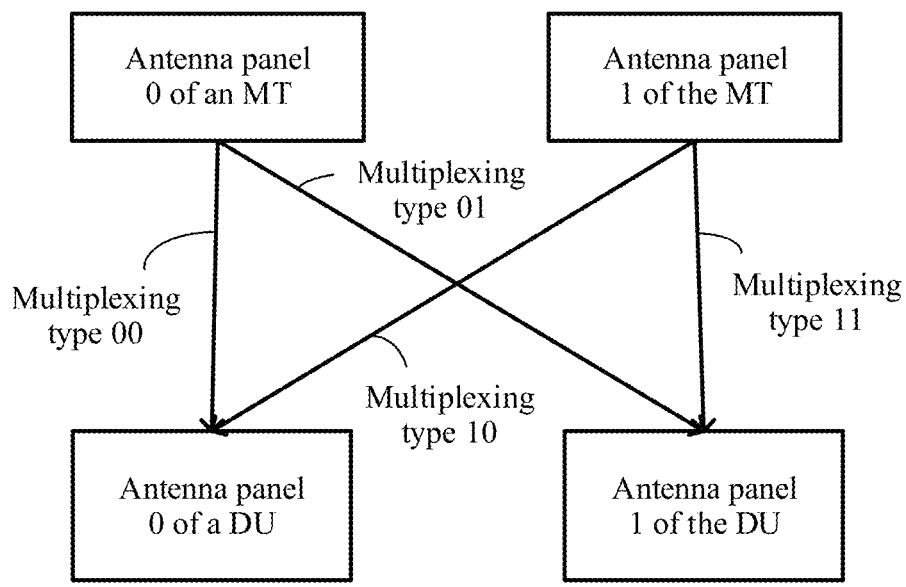
FIG. 7 is a schematic diagram of an example of a plurality of antenna panels of a DU and a plurality of antenna panels of an MT.

FIG. 7 is a schematic diagram of an example of a plurality of antenna panels of a DU and a plurality of antenna panels of an MT. As shown in FIG. 7, a resource multiplexing type between an antenna panel 0 of the MT and an antenna panel 0 of the DU is 00, a resource multiplexing type between the antenna panel 0 of the MT and an antenna panel 1 of the DU is 01, a resource multiplexing type between an antenna panel 1 of the MT and the antenna panel 0 of the DU is 10, and a resource multiplexing type between the antenna panel 1 of the MT and the antenna panel 1 of the DU is 11. The resource multiplexing types in FIG. 7 are merely an example for describing possible combination relationships between different antenna panels. Certainly, for a specific resource multiplexing type, for example, static SDM, dynamic SDM, TDM, or full duplex, refer to the foregoing description. Details are not described herein again. In FIG. 7, a resource of the antenna panel 0 of the DU needs to be jointly determined based on a result derived based on the resource multiplexing type 00 and a result derived based on the resource multiplexing type 10. For example, if the first node determines, based on the resource multiplexing type 00, that a resource a of the antenna panel 0 of the DU is a soft resource, and determines, based on the resource multiplexing type 10, that the resource a of the antenna panel 0 of the DU is a hard resource, the resource a should be finally determined as a soft resource according to the foregoing principle of determining the DU resource. A resource of the antenna panel 1 of the DU needs to be jointly determined based on a result derived based on the resource multiplexing type 01 and a result derived based on the resource multiplexing type 11. For example, if the first node determines, based on the resource multiplexing type 01, that a resource b of the antenna panel 1 of the DU is a hard resource, and determines, based on the resource multiplexing type 11, that the resource b of the antenna panel 0 of the DU is a hard resource, the resource b should be finally determined as a hard resource according to the foregoing principle of determining the DU resource.

It should be understood that the example in FIG. 7 is merely for ease of understanding by a person skilled in the art, and shall not constitute a limitation on the protection scope of the embodiments of this application.

The foregoing embodiment describes a method for deriving, by the first node, a DU resource type based on an MT resource configuration, and a method for deriving, by the first node, an MT resource type based on a DU resource configuration. Optionally, the derivation method is also applicable to a parent node or a donor node of the first node. For example, the parent node or the donor node derives a DU resource type based on the MT resource configuration of the first node by using the foregoing derivation method, or derives an MT resource type based on the DU resource configuration of the first node.

In this embodiment of this application, to ensure successful sending or receiving of a specific physical signal (for example, a broadcast synchronization signal block or a reference signal), a resource configuration of the DU or the MT may be adjusted. Therefore, the resource configuration of an TAB is more flexible. The following provides detailed descriptions. Certainly, the adjustment is not limited to a scenario with a plurality of antenna panels, that is, the adjustment is also applicable to a scenario with a single antenna panel.

Optionally, the method 200 further includes:

if there is a to-be-transmitted signal in the DU or the MT of the first node, adjusting, by the first node, a resource in the resource configuration of the DU. The resource corresponding to the to-be-transmitted signal is a first-type resource. The first-type resource is a hard resource. A case in which the resource configuration of the DU is determined is used as an example for description.

The to-be-transmitted signal may be a synchronization signal (synchronization signal, SS)/physical broadcast channel (physical broadcast channel, PBCH) block (block) (or referred to as a synchronization signal block SSB), or may be a random access channel (random access channel, RACH). It should be understood that the SSB may include an SSB set sent by the TAB node to access UE, or may include an SSB set used for mutual discovery between TAB nodes. This is not limited. Similarly, the RACH channel may include a RACH sent by UE or a remaining TAB node to the TAB node.

Herein, an objective of adjusting the resource in the resource configuration of the DU is to ensure that receiving and sending of a to-be-transmitted signal are always feasible. To be specific, if there is a to-be-transmitted signal in the MT, and a corresponding resource in the DU is a hard resource in this case, the corresponding resource (that is, the hard resource) in the DU may be adjusted, to ensure successful sending or receiving of the to-be-transmitted signal in the MT. If there is a to-be-transmitted signal in the DU, and a corresponding resource in the DU is a soft resource or an unavailable resource in this case, the corresponding resource in the DU may be adjusted to a hard resource, to ensure successful sending or receiving of the to-be-transmitted signal in the DU.

It should be understood that a granularity of resource adjustment is not specifically limited in this embodiment of this application, and may be slot-level conversion, symbol-level conversion, or the like. For example, the slot-level conversion means that resources corresponding to an entire slot including a signal are converted into hard resources. The symbol-level conversion means that only a resource corresponding to a symbol including a signal is converted into a hard resource.

Optionally, if there is a to-be-transmitted signal in the DU, the adjusting, by the first node, the resource configuration of the DU includes:

if the first node determines that a first resource in the resource configuration of the DU is a second-type resource, adjusting, by the first node, the first resource to a first-type resource. The first resource is a resource used by the DU of the first node to transmit the to-be-transmitted signal. The second-type resource is a soft resource or an unavailable resource.

"Adjustment" herein refers to converting a soft resource or an unavailable resource into a hard resource. It should be understood that the "adjustment" herein may be understood as that a soft resource or an unavailable resource is previously configured, but is directly used as a hard resource in actual communication. In other words, regardless of whether the first resource is a soft resource or an unavailable resource, the DU needs to transmit the to-be-transmitted signal on the first resource. It should be understood that for the "adjustment" herein, there may not be separate configuration information to adjust a resource, but instead, an "adjusted" resource may break through a rule constrained by the foregoing preset relationship (for example, the present relationship in Table 1 or Table 2) during actual use, and a soft resource or an unavailable resource is used as a hard resource.

In other words, if there is a to-be-transmitted signal in the DU in the first node, but a first resource used to transmit the to-be-transmitted signal is a soft resource or an unavailable resource in time domain, to avoid affecting sending or receiving of the to-be-transmitted signal in the DU, the first resource may be converted into a hard resource.

Optionally, if there is a to-be-transmitted signal in the DU in the first node, the adjusting, by the first node, the resource configuration of the DU includes:

if the first node determines that a second resource in the resource configuration of the DU is a first-type resource, adjusting, by the first node, the second resource to a second-type resource. The second resource is a resource that overlaps, in time domain, a resource used to transmit the to-be-transmitted signal in the MT of the first node. The second resource is a resource in the DU. It should be understood that the overlapping herein is overlapping in time domain, and does not necessarily occur in frequency domain.

"Adjustment" herein refers to converting a hard resource into a soft resource or an unavailable resource. It should be understood that the "adjustment" herein may be understood as that a hard resource is previously configured, but is directly used as a soft resource or an unavailable resource in actual communication. To be specific, regardless of whether a resource that overlaps the second resource in time domain is a hard resource or a soft resource (or an unavailable resource), the MT needs to transmit the to-be-transmitted signal on the second resource. It should be understood that for the "adjustment" herein, there may not be separate configuration information to adjust a resource, but instead, an "adjusted" resource location may break through a rule constrained by the foregoing preset relationship (for example, the present relationship in Table 1 or Table 2) during actual use, and a hard resource is used as a soft resource or an unavailable resource.

In other words, if there is a to-be-transmitted signal in the MT in the first node, but in time domain, a second resource that corresponds to a resource used to transmit the to-be-transmitted signal and that is in the DU is a hard resource, for the purpose of not affecting sending or receiving of the to-be-transmitted signal in the MT, the second resource may be converted into a soft resource or an unavailable resource, that is, signal transmission of the DU on the second resource needs to be stopped.

Figure 8A:
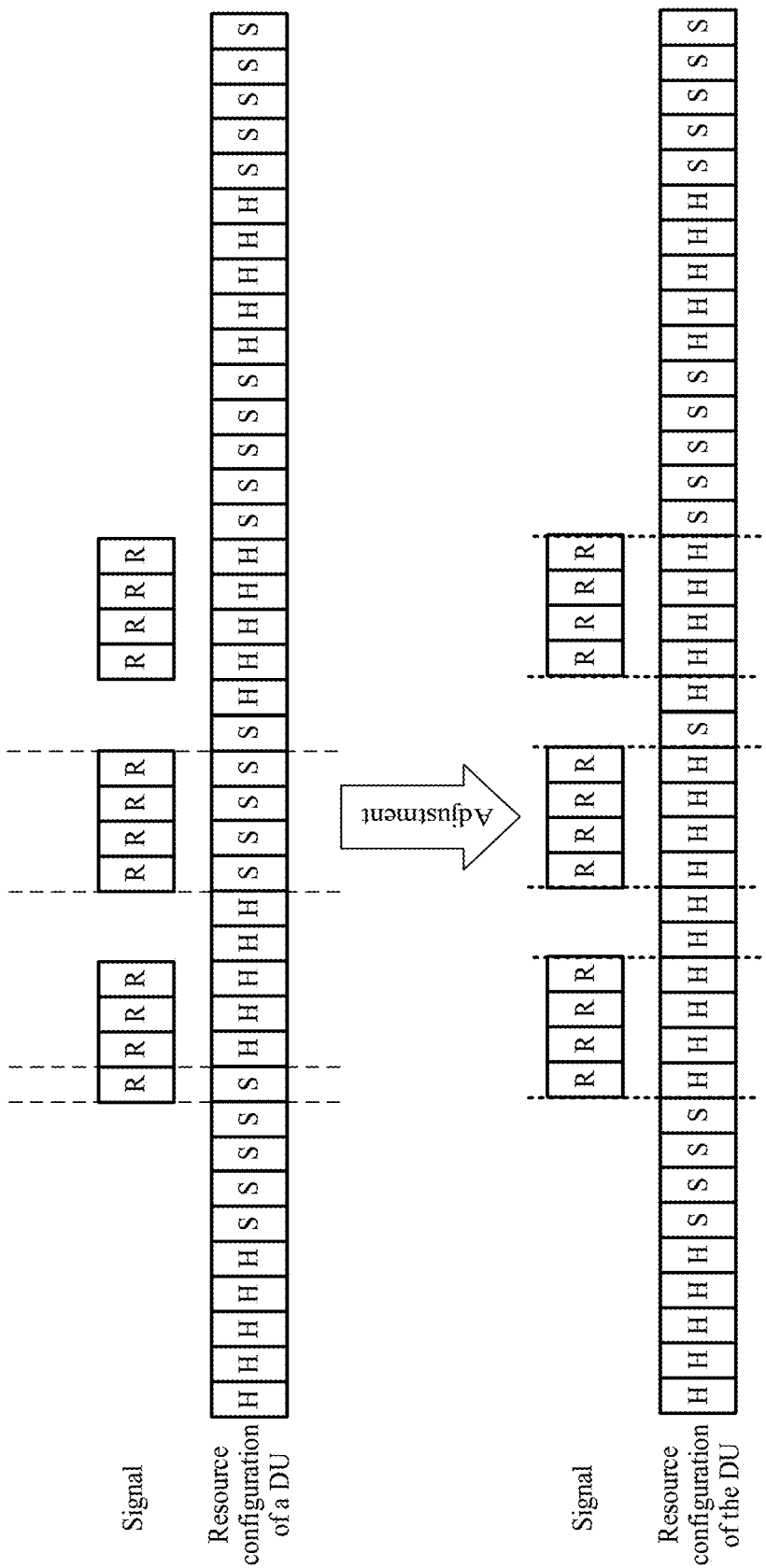
FIG. 8A and FIG. 8B are a schematic diagram of an example of adjusting a resource configuration according to an embodiment of this application.
Figure 8B:
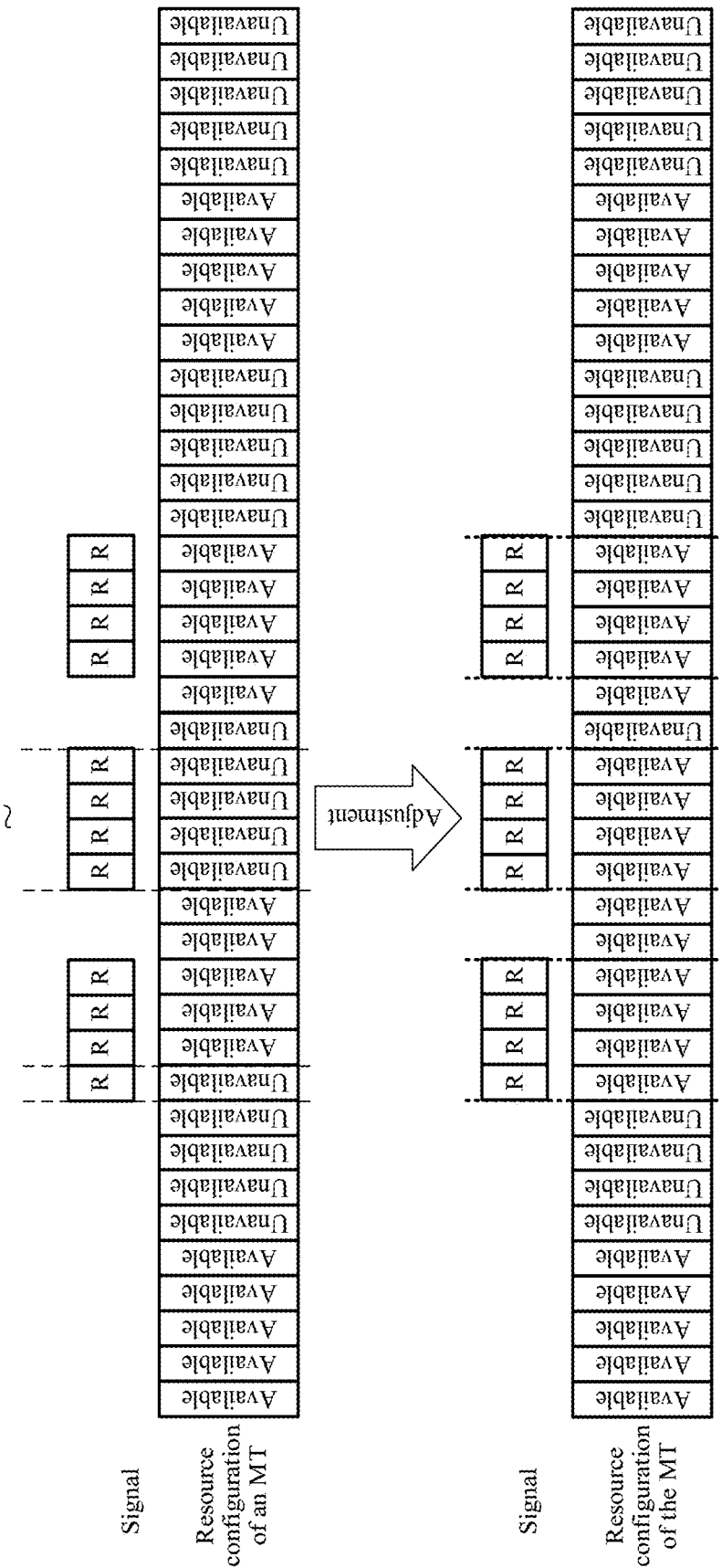

For ease of understanding, the following provides description with reference to an example in FIG. 8A and FIG. 8B. As shown in FIG. 8A and FIG. 8B, a diagram in an upper part of FIG. 8A and FIG. 8B shows a resource configuration before adjustment and an adjusted resource configuration in a DU. A lower part of FIG. 8A and FIG. 8B shows a resource configuration before adjustment and an adjusted resource configuration in an MT. R in FIG. 8A and FIG. 8B represents a signal, for example, an SSB or a RACH. Adjusting the resource configuration of the DU is used as an example for description. It can be learned that a periodicity of the resource configuration of the DU is 10 resource units (including five resource units corresponding to hard resources and five resource units corresponding to soft resources), and a periodicity of transmission of a signal is 40 resource units. When the signal is received or sent, a plurality of signal resources may overlap the soft resources of the DU in time domain. If a signal that is periodically sent or received in the DU needs to completely overlap a hard resource in time domain through configuration, a configuration periodicity of a resource configuration (including soft resources and hard resources) of the DU needs to be equivalent to a transmission periodicity of the signal. For example, it is assumed that the signal is an SSB, and a periodicity of the SSB may be 160 milliseconds (ms), where 640 slots (where a subcarrier spacing is of 60 kHz) may be included therein. If the periodicity of the resource configuration of the DU is increased, signaling overheads are greatly increased.

To avoid an increase in the overheads, a resource in the DU may be adjusted. FIG. 8A and FIG. 8B shows the adjusted resource configuration of the DU. Soft resources in the DU that overlap a plurality of signal resources in time domain are adjusted to hard resources, to ensure successful sending of a periodic signal in the DU, thereby avoiding increasing the signaling overheads. For example, a resource used by the DU to send an SSB or a resource used by the DU to receive a RACH may overlap (for example, overlap in time domain) a soft resource of the DU, and the soft resource of the DU may be adjusted to a hard resource. Alternatively, a resource used by the MT to receive an SSB or a resource used by the MT to send a RACH may overlap (for example, overlap in time domain) an unavailable resource of the MT, and the unavailable resource of the MT may be adjusted to an available resource.

The foregoing describes a manner of adjusting the resource configuration of the DU in FIG. 8A and FIG. 8B. It should be understood that, for the resource configuration of the MT, refer to the foregoing manner, and an unavailable resource is adjusted to an available resource. For brevity, how to adjust the resource configuration of the MT is not described herein. It should be further understood that an example in which a periodicity of the resource configuration of the MT is the same as a periodicity of the resource configuration of the DU is used for description in FIG. 8A and FIG. 8B. However, whether the periodicity of the resource configuration of the DU is the same as the periodicity of the resource configuration of the MT is not limited in this embodiment of this application, and the resource configuration of the DU and the periodicity of the resource configuration of the MT may be the same or may be different.

In other words, a resource (for example, a DU resource) used to send an SSB should be essentially a hard resource. Alternatively, a resource (DU resource) used to receive a RACH should be essentially a hard resource. In another possible case, if a resource that is in MT resources and that is used to receive an SSB (or send a RACH) overlaps, in time domain, a resource that is in DU resources and that is used to send an SSB (or receive a RACH), receiving of the SSB (or sending of the RACH) on the MT resource may be preferentially performed. That is, a resource that is in corresponding resources of the DU and that is used to send an SSB (or receive a RACH) is considered as a soft resource or an unavailable resource.

The foregoing describes a case in which the resource configuration of the DU needs to be adjusted. It should be understood that, for another signal that is periodically sent or received, for example, a reference signal such as a CSI-RS signal that an IAB node requests a parent node to configure, the resource configuration determined above may be used for corresponding sending or receiving, and there is no need to adjust the resource configuration of the DU.

It should be further understood that the foregoing describes a case in which the resource configuration of the DU needs to be adjusted. In a possible implementation, the resource configuration of the MT may be alternatively adjusted. For example, if a signal with a relatively high priority needs to be transmitted in the DU, and the signal overlaps, in time domain, a resource (an available resource) corresponding to a resource configuration of the MT, the corresponding resource of the MT may be adjusted to an unavailable resource, to ensure successful transmission of the signal in the DU. For example, a resource used by the DU to send an SSB or receive a RACH may overlap an available resource of the MT in time domain. In this case, the available resource of the MT may be adjusted to an unavailable resource, that is, a parent node does not schedule, at a corresponding location, the MT of the IAB node to transmit a signal such as a PDSCH or a PUSCH.

It should be understood that examples in FIG. 4 to FIG. 8A and FIG. 8B are provided merely for helping a person skilled in the art understand the embodiments of this application, but are not intended to limit the embodiments of this application to specific scenarios shown in the examples. A person skilled in the art can make various equivalent modifications or changes according to the examples shown in FIG. 4 to FIG. 8A and FIG. 8B, and such modifications or changes also fall within the scope of the embodiments of this application.

It should be further understood that the solutions in the embodiments of this application may be appropriately combined for use, and explanations or descriptions of terms in the embodiments may be mutually referenced or explained in the embodiments. This is not limited.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the resource configuration methods according to the embodiments of this application with reference to FIG. 1 to FIG. 8A and FIG. 8B. The following describes resource configuration apparatuses according to the embodiments of this application with reference to FIG. 9 to FIG. 12. It should be understood that the technical features described in the method embodiments are also applicable to the following apparatus embodiments.

Figure 9:
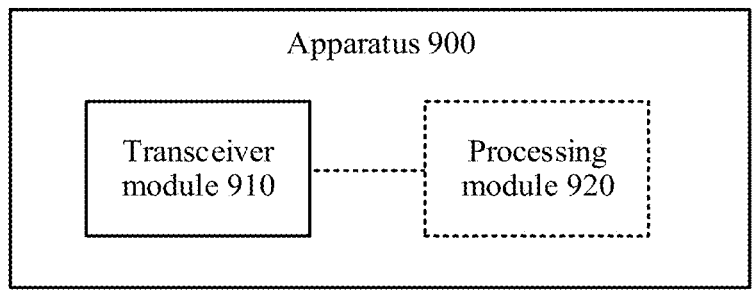
FIG. 9 is a schematic block diagram of a resource configuration apparatus according to an embodiment of this application.

FIG. 9 is a schematic block diagram of a resource configuration apparatus 900 according to an embodiment of this application. The apparatus 900 is configured to perform the method performed by the first node in the foregoing method embodiments. Optionally, a specific form of the apparatus 900 may be a relay node or a chip in a relay node. This is not limited in this embodiment of this application. The apparatus 900 includes:

a transceiver module 910, configured to receive first indication information sent by a second node, where the first indication information is used to indicate a resource multiplexing type between a second functional unit and each of one or more antenna panels of a first functional unit; and the transceiver module 910 is further configured to transmit data on resources of one or more antenna panels of the second functional unit, where resource types of the one or more antenna panels of the second functional unit are determined based on the resource multiplexing type.

In an optional implementation, the transceiver module 910 is further configured to receive resource configuration information from the second node, where the resource configuration information is used to indicate resources of the one or more antenna panels of the first functional unit in the apparatus 900, where the resources of the one or more antenna panels of the second functional unit are determined based on the resource multiplexing type, the resources of the one or more antenna panels of the first functional unit, and a preset relationship, and the preset relationship includes correspondences between resource configurations of the first functional unit and resource configurations of the second functional unit in the first node in cases of different resource multiplexing types.

In an optional implementation, the transceiver module 910 is further configured to send second indication information to the second node, where the second indication information is used to indicate a resource multiplexing type supported between the second functional unit and each antenna panel of the first functional unit; or the second indication information is used to indicate a resource multiplexing type supported between the second functional unit and a first antenna panel of the first functional unit, and the first antenna panel represents an antenna panel whose direction is the same as a direction of an antenna panel used by the second functional unit; or the second indication information is used to indicate a resource multiplexing type supported between the second functional unit and a second antenna panel of the first functional unit, and the second antenna panel represents an antenna panel whose direction is different from a direction of an antenna panel used by the second functional unit.

Optionally, the first functional unit is a mobile termination MT functional unit, and the second functional unit is a distributed unit DU. Alternatively, the first functional unit is a distributed unit DU, and the second functional unit is a mobile termination MT functional unit.

In an optional implementation, when a resource configuration of the DU is determined, the apparatus further includes:

a processing module 920, configured to: if there is a to-be-transmitted signal in the DU or the MT of the first node, adjust a resource in the resource configuration of the DU, where a resource corresponding to the to-be-transmitted signal is a first-type resource.

In an optional implementation, if there is a to-be-transmitted signal in the DU of the apparatus, that the processing module 920 is configured to adjust the resource configuration of the DU specifically includes:

if it is determined that a first resource in the resource configuration of the DU is a second-type resource, adjusting the first resource to a first-type resource, where the first resource is a resource used by the DU of the first node to transmit the to-be-transmitted signal.

In an optional implementation, if there is a to-be-transmitted signal in the MT of the apparatus, that the processing module 920 is configured to adjust the resource configuration of the DU specifically includes:

if it is determined that a second resource in the resource configuration of the DU is a first-type resource, adjusting the second resource to a second-type resource, where the second resource is a resource that overlaps, in time domain, a resource used to transmit the to-be-transmitted signal in the MT of the first node.

Optionally, the to-be-transmitted signal includes one or more of the following signals: a synchronization signal block SSB and a random access channel RACH signal.

It should be understood that the resource configuration apparatus 900 according to this embodiment of this application may correspond to the method of the first node in the foregoing method embodiments, for example, the method in FIG. 3. In addition, the foregoing and other management operations and/or functions of the modules in the apparatus 900 are respectively used to implement corresponding steps of the method of the first node in the foregoing method embodiments. Therefore, beneficial effects in the foregoing method embodiments may also be implemented. For brevity, details are not described herein again.

It should be further understood that the modules in the apparatus 900 may be implemented in a form of software and/or hardware. This is not specifically limited. In other words, the apparatus 900 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 900 may be in a form shown in FIG. 10. The processing module 920 may be implemented by using a processor 1001 shown in FIG. 10. The transceiver module 910 may be implemented by using a transceiver 1003 shown in FIG. 10. Specifically, the processor is implemented by executing a computer program stored in the memory. Optionally, when the apparatus 900 is a chip, a function and/or an implementation process of the transceiver module 910 may alternatively be implemented by a pin, a circuit, or the like. Optionally, the memory is a storage unit in the chip, for example, a register or a buffer. The storage unit may alternatively be a storage unit that is in a computer device and that is located outside the chip, for example, a memory 1002 shown in FIG. 10.

Figure 10:
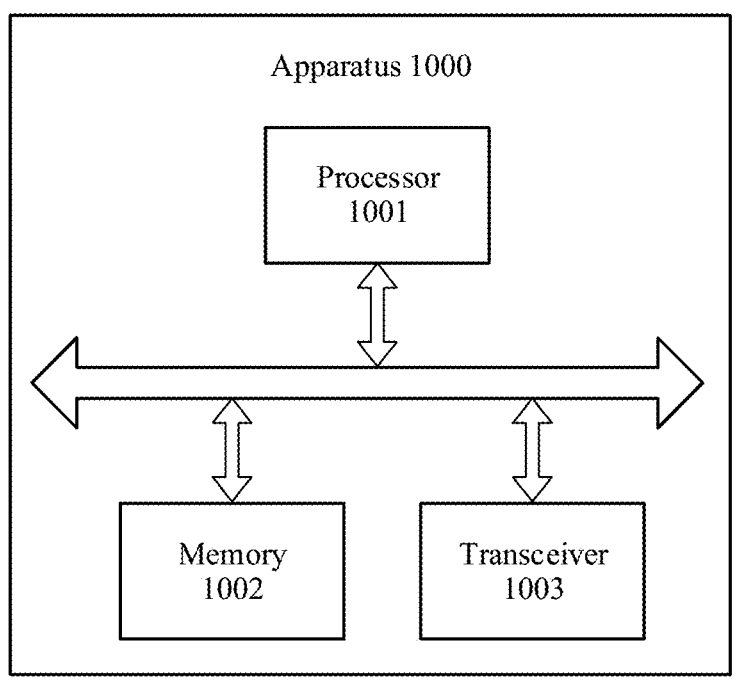
FIG. 10 is a schematic structural diagram of a resource configuration apparatus according to an embodiment of this application.

FIG. 10 is a schematic structural diagram of a resource configuration apparatus 1000 according to an embodiment of this application. As shown in FIG. 10, the apparatus 1000 includes a processor 1001.

In a possible implementation, the processor 1001 is configured to invoke an interface to perform the following actions: receiving first indication information sent by a second node, where the first indication information is used to indicate a resource multiplexing type between a second functional unit and each of one or more antenna panels of a first functional unit; and transmitting data on resources of one or more antenna panels of the second functional unit, where resource types of the one or more antenna panels of the second functional unit are determined based on the resource multiplexing type.

It should be understood that the processor 1001 may invoke the interface to perform the foregoing receiving and sending actions. The invoked interface may be a logical interface or a physical interface. This is not limited. Optionally, the physical interface may be implemented by using a transceiver. Optionally, the apparatus 1000 further includes a transceiver 1003.

Optionally, the apparatus 1000 further includes a memory 1002. The memory 1002 may store program code in the foregoing method embodiments, so that the processor 1001 invokes the program code.

Specifically, if the apparatus 1000 includes the processor 1001, the memory 1002, and the transceiver 1003, the processor 1001, the memory 1002, and the transceiver 1003 communicate with each other by using an internal connection path, to transfer a control signal and/or a data signal. In a possible design, the processor 1001, the memory 1002, and the transceiver 1003 may be implemented by using a chip, and the processor 1001, the memory 1002, and the transceiver 1003 may be implemented in a same chip, or may be separately implemented in different chips, or functions of any two of the processor 1001, the memory 1002, and the transceiver 1003 are implemented in one chip. The memory 1002 may store the program code, and the processor 1001 invokes the program code stored in the memory 1002, to implement a corresponding function of the apparatus 1000.

It should be understood that the apparatus 1000 may be further configured to perform another step and/or operation on the first node side in the foregoing embodiments. For brevity, details are not described herein again.

Figure 11:
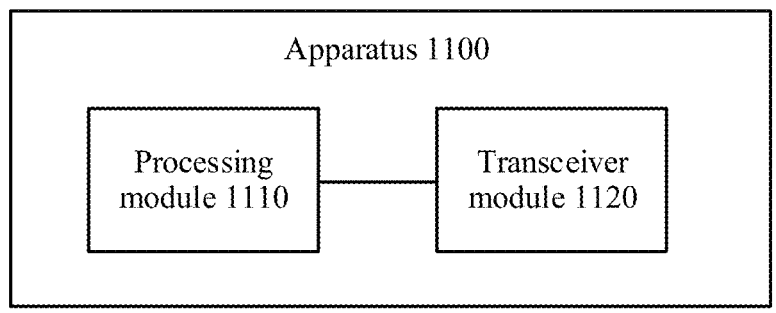
FIG. 11 is a schematic block diagram of a resource configuration apparatus according to another embodiment of this application.

FIG. 11 is a schematic block diagram of a resource configuration apparatus 1100 according to an embodiment of this application. The apparatus 1100 is configured to perform the method performed by the second node in the foregoing method embodiments. The second node is a parent node of the first node. Optionally, a specific form of the apparatus 1100 may be a relay node or a chip in a relay node, or may be a donor base station or a chip in a donor base station. This is not limited in this embodiment of this application. The apparatus 1100 includes:

a processing module 1110, configured to determine first indication information, where the first indication information is used to indicate a resource multiplexing type between a second functional unit and each of one or more antenna panels of a first functional unit, and the resource multiplexing type is used by a first node to determine resources of one or more antenna panels of the second functional unit; and a transceiver module 1120, configured to send the first indication information to the first node.

In an optional implementation, the transceiver module 1120 is further configured to:

send resource configuration information to the first node, where the resource configuration information is used to indicate resources of the one or more antenna panels of the first functional unit in the first node.

In an optional implementation, the transceiver module 1120 is further configured to receive second indication information sent by the first node, where the second indication information is used to indicate a resource multiplexing type supported between the second functional unit and each antenna panel of the first functional unit; or the second indication information is used to indicate a resource multiplexing type supported between the second functional unit and a first antenna panel of the first functional unit, and the first antenna panel represents an antenna panel whose direction is the same as a direction of an antenna panel used by the second functional unit; or the second indication information is used to indicate a resource multiplexing type supported between the second functional unit and a second antenna panel of the first functional unit, and the second antenna panel represents an antenna panel whose direction is different from a direction of an antenna panel used by the second functional unit.

That the processing module 1110 is configured to determine the first indication information includes:

determining, by the second node, the first indication information based on the second indication information.

Optionally, the first functional unit is a mobile termination MT functional unit, and the second functional unit is a distributed unit DU. Alternatively, the first functional unit is a distributed unit DU, and the second functional unit is a mobile termination MT functional unit.

It should be understood that the data transmission apparatus 1100 according to this embodiment of this application may correspond to the method of the second node in the foregoing method embodiments, for example, the method in FIG. 11. In addition, the foregoing and other management operations and/or functions of the modules in the apparatus 1100 are respectively used to implement corresponding steps of the method of the second node in the foregoing method embodiments. Therefore, beneficial effects in the foregoing method embodiments may also be implemented. For brevity, details are not described herein again.

It should be further understood that the modules in the apparatus 1100 may be implemented in a form of software and/or hardware. This is not specifically limited. In other words, the apparatus 1100 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. Optionally, in a simple embodiment, a person skilled in the art may figure out that the apparatus 1100 may be in a form shown in FIG. 12. The processing module 1110 may be implemented by using a processor 1201 shown in FIG. 12. The transceiver module 1120 may be implemented by using a transceiver 1203 shown in FIG. 12. Specifically, the processor is implemented by executing a computer program stored in the memory. Optionally, when the apparatus 1100 is a chip, a function and/or an implementation process of the transceiver module 1120 may alternatively be implemented by a pin, a circuit, or the like. Optionally, the memory is a storage unit in the chip, for example, a register or a buffer. The storage unit may alternatively be a storage unit that is in the computer device and that is located outside the chip, for example, the memory 1202 shown in FIG. 12.

Figure 12:
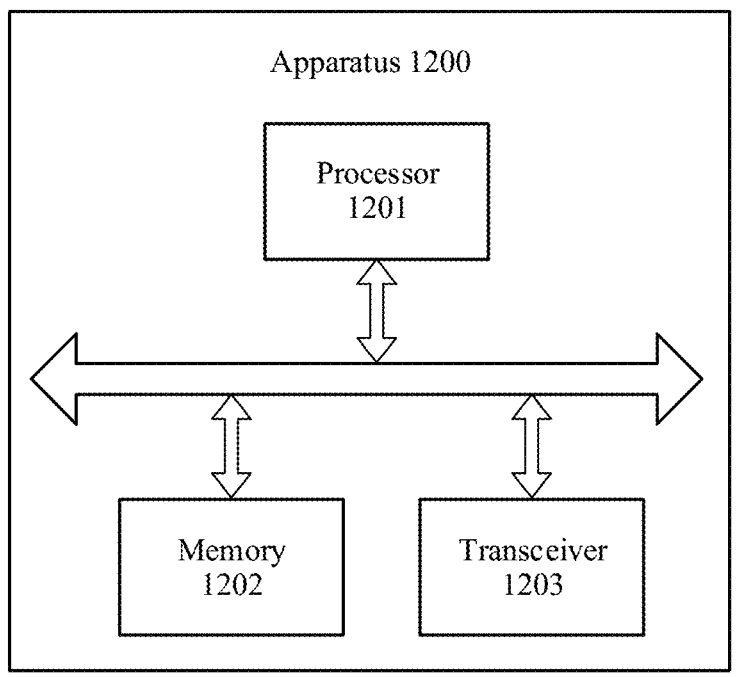
FIG. 12 is a schematic structural diagram of a resource configuration apparatus according to another embodiment of this application.

FIG. 12 is a schematic structural diagram of a resource configuration apparatus 1200 according to an embodiment of this application. As shown in FIG. 12, the apparatus 1200 includes a processor 1201.

In a possible implementation, the processor 1201 is configured to determine first indication information, where the first indication information is used to indicate a resource multiplexing type between a second functional unit and each of one or more antenna panels of a first functional unit, and the resource multiplexing type is used by a first node to determine resources of one or more antenna panels of the second functional unit; and the processor 1201 is further configured to invoke an interface to perform the following action: sending the first indication information to the first node.

It should be understood that the processor 1201 may invoke the interface to perform the foregoing receiving and sending actions. The invoked interface may be a logical interface or a physical interface. This is not limited. Optionally, the physical interface may be implemented by using a transceiver. Optionally, the apparatus 1200 further includes a transceiver 1203.

Optionally, the apparatus 1200 further includes a memory 1202. The memory 1202 may store program code in the foregoing method embodiments, so that the processor 1201 invokes the program code.

Specifically, if the apparatus 1200 includes the processor 1201, the memory 1202, and the transceiver 1203, the processor 1201, the memory 1202, and the transceiver 1203 communicate with each other by using an internal connection path, to transfer a control signal and/or a data signal. In a possible design, the processor 1201, the memory 1202, and the transceiver 1203 may be implemented by using a chip, and the processor 1201, the memory 1202, and the transceiver 1203 may be implemented in a same chip, or may be separately implemented in different chips, or functions of any two of the processor 1201, the memory 1202, and the transceiver 1203 are implemented in one chip. The memory 1202 may store program code, and the processor 1201 invokes the program code stored in the memory 1202, to implement a corresponding function of the apparatus 1200.

It should be understood that the apparatus 1200 may be further configured to perform another step and/or operation on the second node side in the foregoing embodiments. For brevity, details are not described herein again.

The method disclosed in the embodiments of this application may be applied to a processor or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (digital signal processor, DSP), an application-specific integrated circuit (application specific integrated circuit, ASIC), a field programmable gate array (field programmable gate array, FPGA) or another programmable logic device, a discrete gate, a transistor logic device, a discrete hardware component, a system on chip (system on chip, SoC), a central processing unit (central processor unit, CPU), a network processor (network processor, NP), a digital signal processing circuit (digital signal processor, DSP), a micro controller unit (micro controller unit, MCU), a programmable controller (programmable logic device, PLD), or another integrated chip. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another appropriate type.

According to the method provided in the embodiments of this application, this application further provides a computer program product. The computer program product includes computer program code. When the computer program code is run on a computer, the computer is enabled to perform the method in any one of the embodiments shown in FIG. 3 to FIG. 8A and FIG. 8B.

According to the method provided in the embodiments of this application, this application further provides a computer-readable medium. The computer-readable medium stores program code. When the program code is run on a computer, the computer is enabled to perform the method in any one of the embodiments shown in FIG. 3 to FIG. 8A and FIG. 8B.

According to the method provided in the embodiments of this application, this application further provides a system, including the foregoing first node and second node.

It should be understood that in the embodiments of this application, numbers "first", "second", and the like are merely used to distinguish between different objects, for example, to distinguish between different nodes or indication information, and do not constitute a limitation on the scope of the embodiments of this application. The embodiments of this application are not limited thereto.

It should further be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A resource configuration method, comprising:
   in response to determining that a synchronization signal block (SSB) to be sent or a random access channel (RACH) to be received by a distributed unit (DU) is in a first resource in a resource configuration of the DU and the first resource is a soft resource or an unavailable resource, identifying the first resource as a hard resource;
   sending the SSB or receiving the RACH in the first resource; and
   indication information indicating a resource multiplexing type for generating communications between each cell in one or more cells corresponding to a mobile termination of an integrated access and backhaul (IAB) node and each cell in a plurality of cells corresponding to a distributed unit of the IAB node, wherein the resource multiplexing type comprises one or more of time division multiplexing (TDM), space division multiplexing (SDM), or full-duplex multiplexing; and
   sending the indication information to a parent node of the IAB node.

2. The method according to claim 1, wherein the SSB includes an SSB set that is sent to user equipment (UE) or configured for mutual discovery between IAB nodes.

3. The method according to claim 1, wherein the RACH includes a RACH sent by user equipment (UE) or a remaining IAB node.

4. The method according to claim 1, wherein a granularity of the first resource identified is at a slot-level or a symbol-level, wherein resources corresponding to a slot including the SSB or the RACH are treated as hard resources at the slot-level, and wherein a resource corresponding to a symbol including the SSB or the RACH is treated as the hard resource at the symbol-level.

5. A resource configuration method, comprising:
   determining a first resource in a resource configuration of a distributed unit (DU) used by the DU to send a synchronization signal block (SSB) or receive a random access channel (RACH), wherein the first resource is treated as a hard resource in response to determining that the first resource is a soft resource or an unavailable resource;
   scheduling a mobile termination to send or receive a signal in a second resource; and
   receiving indication information indicating a resource multiplexing type for communications between each cell in one or more cells corresponding to a mobile termination of an integrated access and backhaul (IAB) node and each cell in a plurality of cells corresponding to a distributed unit of the IAB node, wherein the resource multiplexing type comprises one or more of time division multiplexing (TDM), space division multiplexing (SDM), or full-duplex multiplexing.

6. The method according to claim 5, wherein the signal comprises physical downlink shared channel (PDSCH) or physical uplink shared channel (PUSCH).

7. The method according to claim 5, wherein a granularity of the first resource identified is at a slot-level or a symbol-level, wherein resources corresponding to a slot including the SSB or the RACH are treated as hard resources at the slot-level, and wherein a resource corresponding to a symbol including the SSB or the RACH is treated as the hard resource at the symbol-level.

8. A communications apparatus, comprising at least one processor, the at least one processor is coupled to a memory that stores instructions for execution by the at least one processor to cause the apparatus to:
   in response to determining that a synchronization signal block (SSB) to be sent or a random access channel (RACH) to be received by a distributed unit (DU) is in a first resource in a resource configuration of the DU and the first resource is a soft resource or an unavailable resource, identify the first resource as a hard resource;
   send the SSB or receive the RACH in the first resource; and
   receive indication information indicating a resource multiplexing type for communications between each cell in one or more cells corresponding to a mobile termination of an integrated access and backhaul (IAB) node and each cell in a plurality of cells corresponding to a distributed unit of the IAB node, wherein the resource multiplexing type comprises one or more of time division multiplexing (TDM), space division multiplexing (SDM), or full-duplex multiplexing.

9. The apparatus according to claim 8, wherein the SSB includes an SSB set that is sent to user equipment (UE) or configured for mutual discovery between IAB nodes.

10. The apparatus according to claim 8, wherein the RACH includes a RACH sent by user equipment (UE) or a remaining IAB node.

11. The apparatus according to claim 8, wherein a granularity of the first resource identified is at a slot-level or a symbol-level, wherein resources corresponding to a slot including the SSB or the RACH are treated as hard resources at the slot-level, and wherein a resource corresponding to a symbol including the SSB or the RACH is treated as the hard resource at the symbol-level.

12. A communications apparatus, comprising at least one processor, the at least one processor is coupled to a memory that stores instructions for execution by the at least one processor to cause the apparatus to:
   determine a first resource in a resource configuration of a distributed unit (DU) used by the DU to send a synchronization signal block (SSB) or receive a random access channel (RACH), wherein the first resource is treated as a hard resource in response to determining that the first resource is a soft resource or an unavailable resource;
   schedule a mobile termination to send or receive a signal in a second resource; and
   receive indication information indicating a resource multiplexing type for communications between each cell in one or more cells corresponding to a mobile termination of an integrated access and backhaul (IAB) node and each cell in a plurality of cells corresponding to a distributed unit of the IAB node, wherein the resource multiplexing type comprises one or more of time division multiplexing (TDM), space division multiplexing (SDM), or full-duplex multiplexing.

13. The apparatus according to claim 12, wherein the signal comprises physical downlink shared channel (PDSCH) or physical uplink shared channel (PUSCH).

14. The apparatus according to claim 12, wherein a granularity of the first resource identified is at a slot-level or a symbol-level, wherein resources corresponding to a slot including the SSB or the RACH are treated as hard resources at the slot-level, and wherein a resource corresponding to a symbol including the SSB or the RACH is treated as the hard resource at the symbol-level.

15. A communications method comprising:
generating indication information indicating a resource multiplexing type for communications between each carrier in one or more carriers corresponding to a mobile termination of an integrated access and backhaul (IAB) node and each cell in a plurality of cells corresponding to a distributed unit of the IAB node; and
sending the indication information to a parent node of the IAB node.

16. A communications method comprising:
receiving indication information, wherein the indication information indicates a resource multiplexing type for communications between each carrier in one or more carriers corresponding to a mobile termination of an integrated access and backhaul (IAB) node and each cell in a plurality of cells corresponding to a distributed unit of the IAB node.

* * * * *

UNITED STATES PATENT AND TRADEMARK OFFICE
CERTIFICATE OF CORRECTION

PATENT NO. : 12,200,743 B2  
APPLICATION NO. : 18/462719  
DATED : January 14, 2025  
INVENTOR(S) : Fengwei Liu et al.

Page 1 of 1

It is certified that error appears in the above-identified patent and that said Letters Patent is hereby corrected as shown below:

In the Claims

In Column 37, In Line 20, In Claim 1, before "indication" insert -- generating --.

In Column 37, In Line 21, In Claim 1, after "for" delete "generating".

Signed and Sealed this
Twenty-second Day of April, 2025

Coke Morgan Stewart
*Acting Director of the United States Patent and Trademark Office*